United States Patent
Hirakata et al.

(10) Patent No.: US 10,638,012 B2
(45) Date of Patent: Apr. 28, 2020

(54) INFORMATION PROCESSING SYSTEM, INFORMATION PROCESSING APPARATUS, AND INFORMATION PROCESSING METHOD

(71) Applicants: Satoru Hirakata, Tokyo (JP); Ryoh Takemoto, Tokyo (JP)

(72) Inventors: Satoru Hirakata, Tokyo (JP); Ryoh Takemoto, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/646,193

(22) Filed: Jul. 11, 2017

(65) Prior Publication Data

US 2018/0020110 A1    Jan. 18, 2018

(30) Foreign Application Priority Data

Jul. 14, 2016 (JP) ................... 2016-139280
Mar. 30, 2017 (JP) ................... 2017-067797

(51) Int. Cl.
*G06F 9/44* (2018.01)
*H04N 1/00* (2006.01)
(Continued)

(52) U.S. Cl.
CPC ........... *H04N 1/00949* (2013.01); *G06F 8/60* (2013.01); *H04N 1/0097* (2013.01);
(Continued)

(58) Field of Classification Search
CPC .. G06F 8/60; H04N 1/00344; H04N 1/00949; H04N 1/00973; H04N 2201/0039;
(Continued)

(56) References Cited

U.S. PATENT DOCUMENTS 8,464,942 B2 * 6/2013 Bennett ............... G06Q 30/0207
235/383
8,534,552 B2 * 9/2013 Bennett ............... G06Q 30/0207
235/383
(Continued)

FOREIGN PATENT DOCUMENTS

| JP | 2005-310096 | 11/2005 |
| JP | 2007-276387 | 10/2007 |
| JP | 2011-100226 | 5/2011 |

OTHER PUBLICATIONS

Cisco, "Cisco Data Center Infrastructure 2.5 Design Guide", Nov. 2, 2011, Cisco Systems, Inc., 180 pages (Year: 2011).*

(Continued)

*Primary Examiner* — Ted T. Vo
(74) *Attorney, Agent, or Firm* — IPUSA, PLLC

(57) ABSTRACT

An information processing system is provided that includes a first information processing apparatus and a second information processing apparatus. The first information processing apparatus includes a first storage unit configured to store a first program that has been developed at a first region and a first processor configured to implement processes of receiving, via a network, a second program that has been developed at a second region and stored in the second information processing apparatus, and generating a program product unit including at least one selected program that has been selected by a user from among the first program stored in the first storage unit and the second program received via the network.

16 Claims, 47 Drawing Sheets

(51) Int. Cl.
*G06F 8/60* (2018.01)
*H04N 1/23* (2006.01)
*G06Q 50/18* (2012.01)

(52) U.S. Cl.
CPC ..... *H04N 1/00204* (2013.01); *H04N 1/00344* (2013.01); *H04N 1/00938* (2013.01); *H04N 1/00962* (2013.01); *H04N 1/00973* (2013.01); *H04N 1/2338* (2013.01); *G06Q 50/184* (2013.01); *H04N 2201/0039* (2013.01); *H04N 2201/0082* (2013.01)

(58) Field of Classification Search
CPC ....... H04N 2201/0082; H04N 1/00204; H04N 1/00938; H04N 1/0097; H04N 1/00962; H04N 1/2338; G06Q 50/184
USPC .................................. 717/101–106, 171, 176
See application file for complete search history.

(56) References Cited

U.S. PATENT DOCUMENTS

| | | | |
|---|---|---|---|
| 9,210,159 B2 | 12/2015 | Satoh et al. | |
| 9,251,150 B2 | 2/2016 | Hirakata et al. | |
| 9,659,154 B2 | 5/2017 | Takemoto et al. | |
| 2004/0006586 A1* | 1/2004 | Melchione | G06F 8/61 709/201 |
| 2009/0037287 A1* | 2/2009 | Baitalmal | G06F 21/128 705/27.1 |
| 2009/0037337 A1* | 2/2009 | Baitalmal | G06Q 99/00 705/59 |
| 2009/0216548 A1* | 8/2009 | Balu | G06Q 50/18 705/311 |
| 2012/0215662 A1 | 8/2012 | Ito | |
| 2014/0122350 A1 | 5/2014 | Takemoto et al. | |
| 2014/0223320 A1 | 8/2014 | Sugimura et al. | |
| 2015/0095988 A1 | 4/2015 | Hirakata | |
| 2015/0161407 A1 | 6/2015 | Hirakata | |
| 2015/0205510 A1 | 7/2015 | Hirakata | |
| 2016/0012210 A1 | 1/2016 | Takemoto et al. | |

OTHER PUBLICATIONS

Sharlene Aminullah, "Cost Estimation of Service Delivery in Cloud Computing", Aug. 2012 2011, Arjuna Technologies Ltd., 95 pages (Year: 2011).*

Mileff et al., "Application Servers in E-Commerce Applications", microCAD 2005, 19th International Scientific Conference, University of Miskolc Hungary, 7 pages (Year: 2005).*

Eric Carter, "Process and Track Orders Across Multiple Sites and Apps with ShippingEasy", 2013, retrieved from, https://www.programmableweb.com/news/process-and-track-orders-across-multiple-sites-and-apps-shippingeasy/2013/01/02/, 4 pages. (Year: 2013).*

* cited by examiner

FIG.5

| USER NAME | PASSWORD | NAME | ... | AFFILIATED BASE | ... |
|---|---|---|---|---|---|
| aaa | xxxx | XXXX | ... | A | ... |
| bbb | xxxxx | YYYYY | ... | B | ... |
| .. | .. | .. | .. | .. | .. |

| APPLICATION ID | NAME | ICON | FUNCTIONAL CATEGORY | DEVELOPER | LANGUAGE | DESCRIPTION | REGISTRATION DATE/TIME | PAID/FREE | FEE | RELEASE RANGE |
|---|---|---|---|---|---|---|---|---|---|---|
| ⋮ | ⋮ | ⋮ | ⋮ | ⋮ | ⋮ | ⋮ | ⋮ | ⋮ | ⋮ | A |
| ⋮ | ⋮ | ⋮ | ⋮ | ⋮ | ⋮ | ⋮ | ⋮ | ⋮ | ⋮ | A, B |
| ⋮ | ⋮ | ⋮ | ⋮ | ⋮ | ⋮ | ⋮ | ⋮ | ⋮ | ⋮ | B, C |
| ·· | ·· | ·· | ·· | ·· | ·· | ·· | ·· | ·· | ·· | ·· |

Application List Screen

[Release] (531)

| Name | Description | Registration Date/Time |
|---|---|---|
| cloud-centric-apps | Cloud-centric MFP | 2016-04-07T01:24:14Z |
| techshare-demo | TechShare demo app | 2016-04-07T01:24:14Z |
| lom1 | Data storage theme comprehensive test | 2016-04-07T01:24:14Z |
| ckai_members | C development member demo | 2016-04-07T01:24:14Z |
| easy_setup_local_dev | SI standard app | 2016-04-07T01:24:14Z |
| cameltest | | 2016-04-07T01:24:14Z |
| cloud-centric-apps-extra | Cloud-centric MFP extra app search | 2016-04-07T01:24:14Z |
| lom2 | Data storage theme comprehensive test | 2016-04-07T01:24:14Z |
| lom3 | Data storage theme comprehensive test | 2016-04-07T01:24:14Z |

| ASSET ID | NAME | ICON | FUNCTIONAL CATEGORY | DEVELOPER | LANGUAGE | DESCRIPTION | REGISTRATION DATE/TIME | PAID/FREE | FEE | RELEASE SOURCE | RELEASE RANGE |
|---|---|---|---|---|---|---|---|---|---|---|---|
| AID0001 | ... | ... | ... | ... | ... | ... | ... | ... | ... | ... | A |
| AID0002 | ... | ... | ... | ... | ... | ... | ... | ... | ... | ... | A, B |
| AID0003 | ... | ... | ... | ... | ... | ... | ... | ... | ... | ... | UID0001 |
| AID0004 | ... | ... | ... | ... | ... | ... | ... | ... | ... | ... | A, C |
| AID0005 | ... | ... | ... | ... | ... | ... | ... | ... | ... | ... | B, C, D |
| .. | .. | .. | .. | .. | .. | .. | .. | .. | .. | .. | .. |

Asset List Screen — 540

▶ Functional Category — 542
☐ All
☐ Print
☑ Scan
☐ Conversion
☐ Authentication
☐ Transmission
▶ Developer
☑ All
☐ RRR
☐ RRRJ
☐ RRRC
☐ RRRE
▶ Paid/Free
☑ All
☐ Paid
☐ Free

541

| Name | Functional Category | Developer | Paid/Free | Registration Date | Release Source |
|---|---|---|---|---|---|
| Scan to Mail | Scan/Transmission/Conversion | RRRJ | Free | 2016/4/30 | A |
| One-Touch Scan | Scan | RRRJ | Free | 2016/4/30 | A |

FIG.13

Asset Detail Screen

Scan to Mail

Import —552

Detail Information

| | | |
|---|---|---|
| Name | Scan to Mail | |
| Functional Category | Scan/Mail | |
| Language | Japanese/English | |
| Registration Date | 2016/06/08 | |
| Description | Email scanned document as a PDF file | |
| Fee | ¥1/mail<br>*If free, indicate as "Free" | |

| PACKAGE ID | PACKAGE NAME | DESCRIPTION | APPLICATION ID GROUP | RELEASE RANGE | LICENSE CONTROL |
|---|---|---|---|---|---|
| ⋮ | ⋮ | ⋮ | ⋮ | A, B | VALID |
| ⋮ | ⋮ | ⋮ | ⋮ | A, D | VALID |
| ⋮ | ⋮ | ⋮ | ⋮ | A | VALID |
| ⋮ | ⋮ | ⋮ | ⋮ | A, C | INVALID |
| ⋮ | ⋮ | ⋮ | ⋮ | B, C, D | VALID |
| ⋯ | ⋯ | ⋯ | ⋯ | ⋯ | ⋯ |

Package List Screen — 580

Create — 582

| | Package Name | Description |
|---|---|---|
| ☐ | Box Cooperation | Box Cooperation Application |
| ☐ | for Office | Standard Office Package |
| ☐ | test | |
| ☐ | test | |
| ☐ | Namihira Package | Namihira Package |

New Package Creation Screen — 590

① Package Information Input — ② Confirmation — ③ Application Selection — ④ License Definition Creation/Addition — ⑤ Completion Please enter package information.

- *Package Name: [Package Name] — 591
- Description: [Description]
- *License Control: ○ Valid  ● Invalid
- *Release Range: [Base Designation ▼]
  - Base: ○ A  ○ B  ○ C  ○ D

[Return] [Next] — 592

FIG.22

| LICENSE DEFINITION ID | LICENSE DEFINITION NAME | VALIDITY PERIOD | PACKAGE ID | VALIDITY STATUS |
|---|---|---|---|---|
| LDID0001 | LICENSE DEFINITION 1 | 12 MONTHS | PID0001 | VALID |
| LDID0002 | LICENSE DEFINITION 2 | 1 MONTH | PID0001 | VALID |
| LDID0003 | LICENSE DEFINITION 3 | 60 DAYS | PID0002 | VALID |
| LDID0004 | LICENSE DEFINITION 4 | UNLIMITED | PID0002 | VALID |
| LDID0005 | LICENSE DEFINITION 5 | 60 MONTHS | PID0002 | INVALID |

FIG.24

License Definition Creation Screen

Please enter license definition information.

License Definition Name

License Definition Name — 761

Validity Period

○ Designate by Month [1 ▼] Months

○ Designate by Day [1 ▼] Days

⦿ Unlimited

Valid/Invalid

⦿ Valid ○ Invalid

[Cancel] [Create] — 762

License Definition Edit Screen

Please edit license definition.

License Definition Name

LID001  — 781

Validity Period

⦿ Designate by Month  [1 ▼] Months

○ Designate by Day  [1 ▼] Days

○ Unlimited

Valid/Invalid

⦿ Valid   ○ Invalid

[Cancel]  [Create] — 782

Application Addition Screen

Application List

Please select application to be added to package and press [Create] button.

Return | Next ← 661

| Icon | Application Name |
|---|---|
| 🖨 | Guest Print |
| ⬅ | ioapp-scan-none |
| ⬅ | ioapp-scan-user |
| 🖨 | Job Print |

Initial Data Selection Screen — 670

Basic Setting

Please select setting.

| Setting Name ▲ | Description |
|---|---|
| ○ Job Print(pcl EU) | Job Print(pcl EU) Default data. |
| ○ Job Print(pcl NA) | Job Print(pcl NA) Default data. |
| ○ Job Print(rpcs) | Job Print(rpcs) Default data. |

Return | OK — 671

FIG.36

Customer Search Screen — 680

Customer Search

| Customer Name | | | |
| Use | | Registration Category | Customer |
| Registration Date | | Registrant | |
| | | Country | Japan |
| | | Return | Search — 681 |

FIG.37

| CUSTOMER ID | PASSWORD | CUSTOMER NAME | USE | REGISTRATION CATEGORY | REGISTRANT | COUNTRY | PURCHASED PACKAGE | ISSUED LICENSE ID |
|---|---|---|---|---|---|---|---|---|
| ⋮ | ⋮ | ⋮ | ⋮ | ⋮ | ⋮ | ⋮ | ⋮ | LID001 |
| ⋮ | ⋮ | ⋮ | ⋮ | ⋮ | ⋮ | ⋮ | ⋮ | LID002 LID005 |
| ⋮ | ⋮ | ⋮ | ⋮ | ⋮ | ⋮ | ⋮ | ⋮ | LID003 |
| ⋯ | ⋯ | ⋯ | ⋯ | ⋯ | ⋯ | ⋯ | ⋯ | ⋯ |

Customer List Screen ~690

Customer Selection

| Customer Name | Customer ID | Use | Registration Category | Registration Date | Registrant | Country |
|---|---|---|---|---|---|---|
| ○ nagano000 | 3142548890 | activated | customer | Thu Apr 21 05:03:36 UTC 2016 | user0002 | FR |
| ○ nagano0000 | 3141756086 | activated | customer | Thu Apr 21 05:05:05 UTC 2016 | user0002 | DE |
| ○ nagano10 | 2183079314 | activated | customer | Thu Apr 21 02:29:57 UTC 2016 | user0002 | CA |
| ○ nagano111 | 2149692556 | activated | customer | Thu Apr 22 05:21:37 UTC 2016 | user0002 | US |
| ○ namihira49 | 1198709367 | activated | customer | Thu Mar 31 09:38:52 UTC 2016 | user0002 | JP |
| ○ mukasa_test | 1197450884 | activated | customer | Thu Jun 07 04:39:05 UTC 2016 | user0002 | JP |
| ○ sicustomer0007 | 1191104496 | activated | customer | Thu Mar 31 09:12:09 | user0002 | JP |

FIG.39

Customer Information Screen — 710

Please select operation.

ⓘ Customer Information — 711

| Customer Name | Customer ID | Use | Registration Category | Registration Date | Registrant | Country |
|---|---|---|---|---|---|---|
| mukasa_test | 1197450884 | activated | customer | Thu Jun 07 04:39:05 UTC 2016 | user0002 | JP |

📣 Purchased Package — 712

| Package Name | Description |
|---|---|
| | SI Application |

[ Add Package ] — 713

FIG.40

Package Selection Screen

Package Name

☐ for Office

Assign Package  Return

FIG.41

License Definition Selection Screen — 790

① Package Selection — ② License Definition Selection — ③ Confirmation — ④ Completion Please select license definition to be set to package.

Selection Package A

| Available Definition List | License Definition Name | Validity Period |
|---|---|---|
| ● | License Definition A | Unlimited |
| ○ | License Definition B | 10 Months |
| ○ | License Definition C | 2 Months |
| ○ | License Definition D | 5 Days |

Selection Package B

| Available Definition List | License Definition Name | Validity Period |
|---|---|---|
| ● | License Definition E | 1 Month |
| ○ | License Definition F | 10 Days |

Selection Package C

No License Control

[Return] [Next] — 791

FIG.42

| LICENSE ID | LICENSE DEFINITION ID | USE START DATE | USE END DATE | STATUS |
|---|---|---|---|---|
| LID001 | LDID0001 | 2017/4/1 | 2018/3/31 | VALID |
| LID002 | LDID0001 | 2015/4/1 | 2016/3/31 | INVALID |
| LID003 | LDID0003 | 2017/1/1 | 2017/3/1 | VALID |
| LID004 | LDID0004 | 2017/1/1 | – | VALID |
| LID005 | LDID0003 | 2016/10/1 | 2016/11/29 | INVALID |

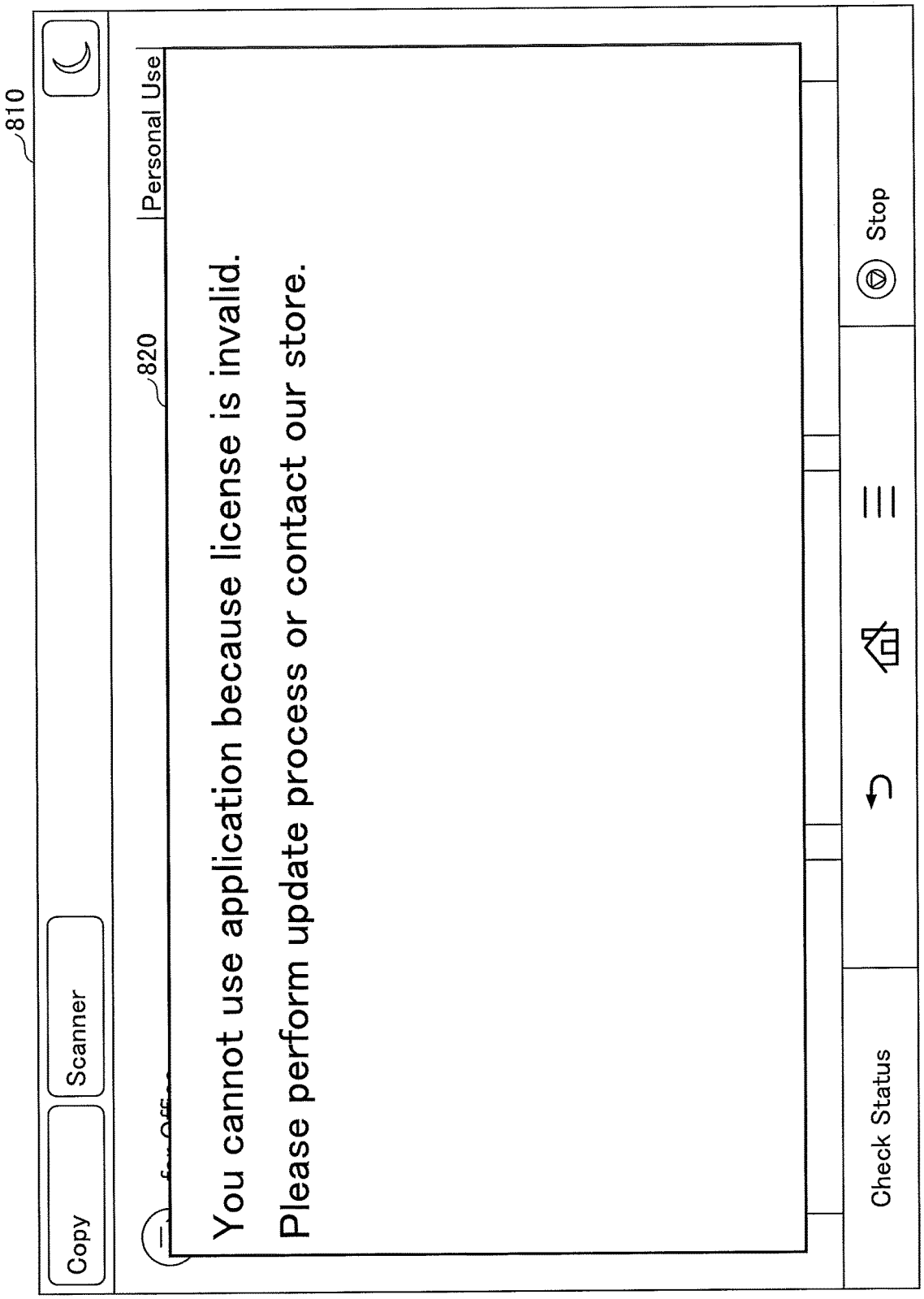

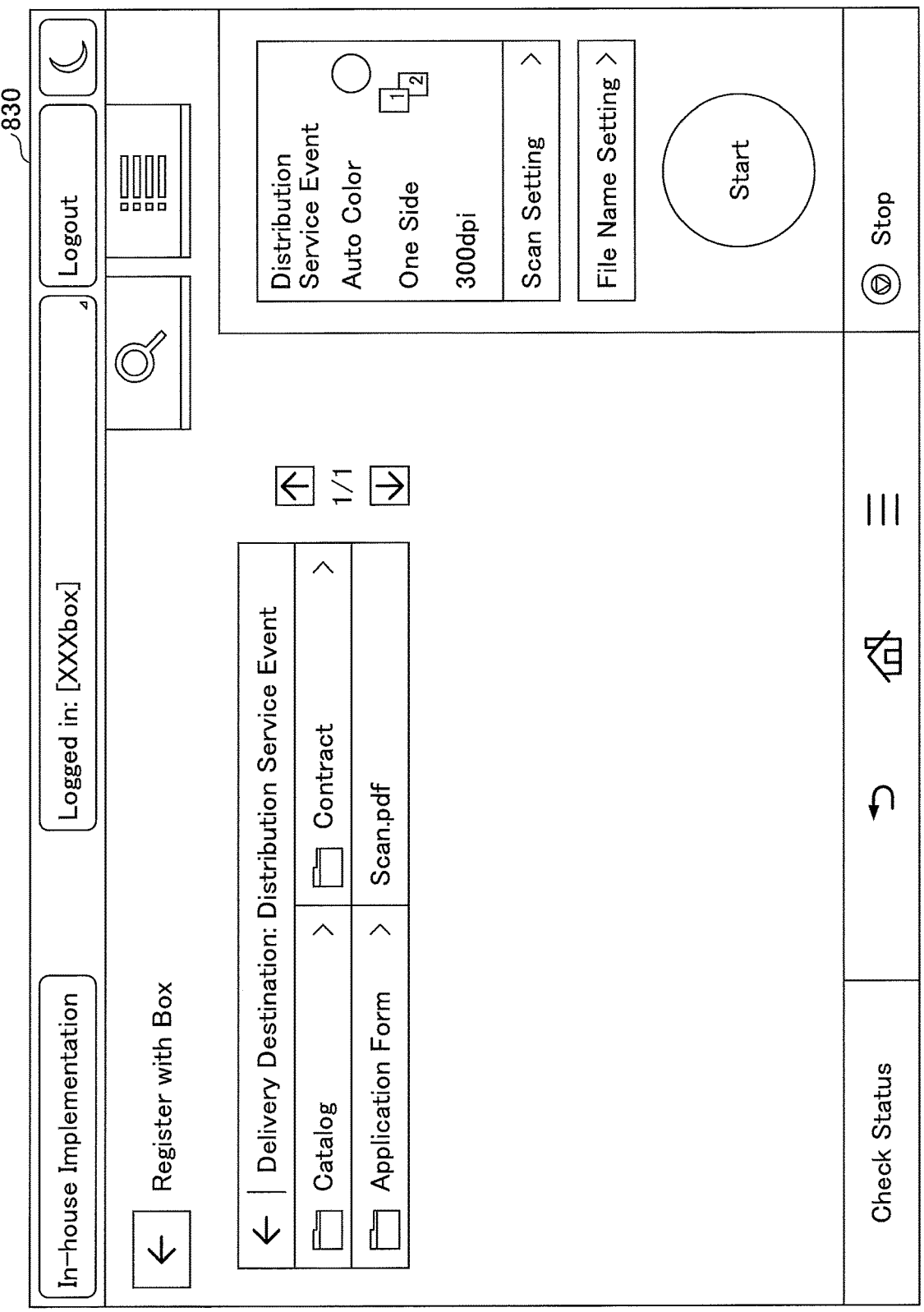

INFORMATION PROCESSING SYSTEM, INFORMATION PROCESSING APPARATUS, AND INFORMATION PROCESSING METHOD

CROSS-REFERENCE TO RELATED APPLICATIONS

The present application claims priority under 35 U.S.C. § 119 to Japanese Patent Application No. 2016-139280 filed on Jul. 14, 2016 and Japanese Patent Application No. 2017-067797 filed on Mar. 30, 2017, the entire contents of which are incorporated herein by reference.

BACKGROUND OF THE INVENTION

1. Field of the Invention

The present invention relates to an information processing system, an information processing apparatus, and an information processing method.

2. Description of the Related Art

Companies selling devices in a global environment may have regional bases established at different regions and have each regional base develop application programs (hereinafter simply referred to as "applications") that run on their devices. For example, preferences of device users may vary in different regions, such as Europe, North America, and Japan. As such, an application that can provide services suited for each region is preferably developed at each region.

Applications developed at each regional base are managed by a system installed at the corresponding regional base and are sold within the corresponding region.

However, user preferences of different regions are not necessarily completely different, and similar requests may be made by customers of different regions. In such a case, applications having similar functions may be developed at multiple regional bases and development efficiency of the company as a whole may be compromised.

SUMMARY OF THE INVENTION

According to one embodiment of the present invention, an information processing system is provided that includes a first information processing apparatus and a second information processing apparatus. The first information processing apparatus includes a first storage unit configured to store a first program that has been developed at a first region and a first processor configured to implement processes of receiving, via a network, a second program that has been developed at a second region and stored in the second information processing apparatus, and generating a program product unit including at least one selected program that has been selected by a user from among the first program stored in the first storage unit and the second program received via the network.

BRIEF DESCRIPTION OF THE DRAWINGS

FIG. 5 is a table illustrating an example configuration of a user information storage unit;

FIG. 8 is a table illustrating an example configuration of an application information storage unit;

FIG. 9 is a diagram illustrating an example display of an application list screen;

FIG. 10 is a table illustrating an example configuration of an asset information storage unit;

FIG. 12 is a diagram illustrating an example display of an asset list screen;

FIG. 13 is a diagram illustrating an example display of an asset detail screen;

FIG. 18 is a table illustrating an example configuration of a package information storage unit;

FIG. 19 is a diagram illustrating an example display of a package list screen;

FIG. 20 is a diagram illustrating an example display of a new package creation screen;

FIG. 22 is a table illustrating an example configuration of a license definition storage unit;

FIG. 24 is a diagram illustrating an example display of a license definition creation screen;

FIG. 26 is a diagram illustrating an example display of a license definition edit screen;

FIG. 33 is a diagram illustrating an example display of an application addition screen;

FIG. 34 is a diagram illustrating an example display of an initial data selection screen;

FIG. 36 is a diagram illustrating an example display of a customer search screen;

FIG. 37 is a table illustrating an example configuration of a customer information storage unit;

FIG. 38 is a diagram illustrating an example display of a customer list screen;

FIG. 39 is a diagram illustrating an example display of a customer information screen;

FIG. 40 is a diagram illustrating an example display of a package selection screen;

FIG. 41 is a diagram illustrating an example display of a license definition selection screen;

FIG. 42 is a table illustrating an example configuration of a license storage unit;

FIG. 46 is a diagram illustrating an example display of an invalid license screen; and FIG. 47 is a diagram illustrating an example display of an application screen.

DESCRIPTION OF THE EMBODIMENTS

An aspect of the present invention is directed to improving portability and reusability of a program for a device that has been developed at each region.

In the following, embodiments of the present invention are described with reference to the accompanying drawings.

Figure 1:
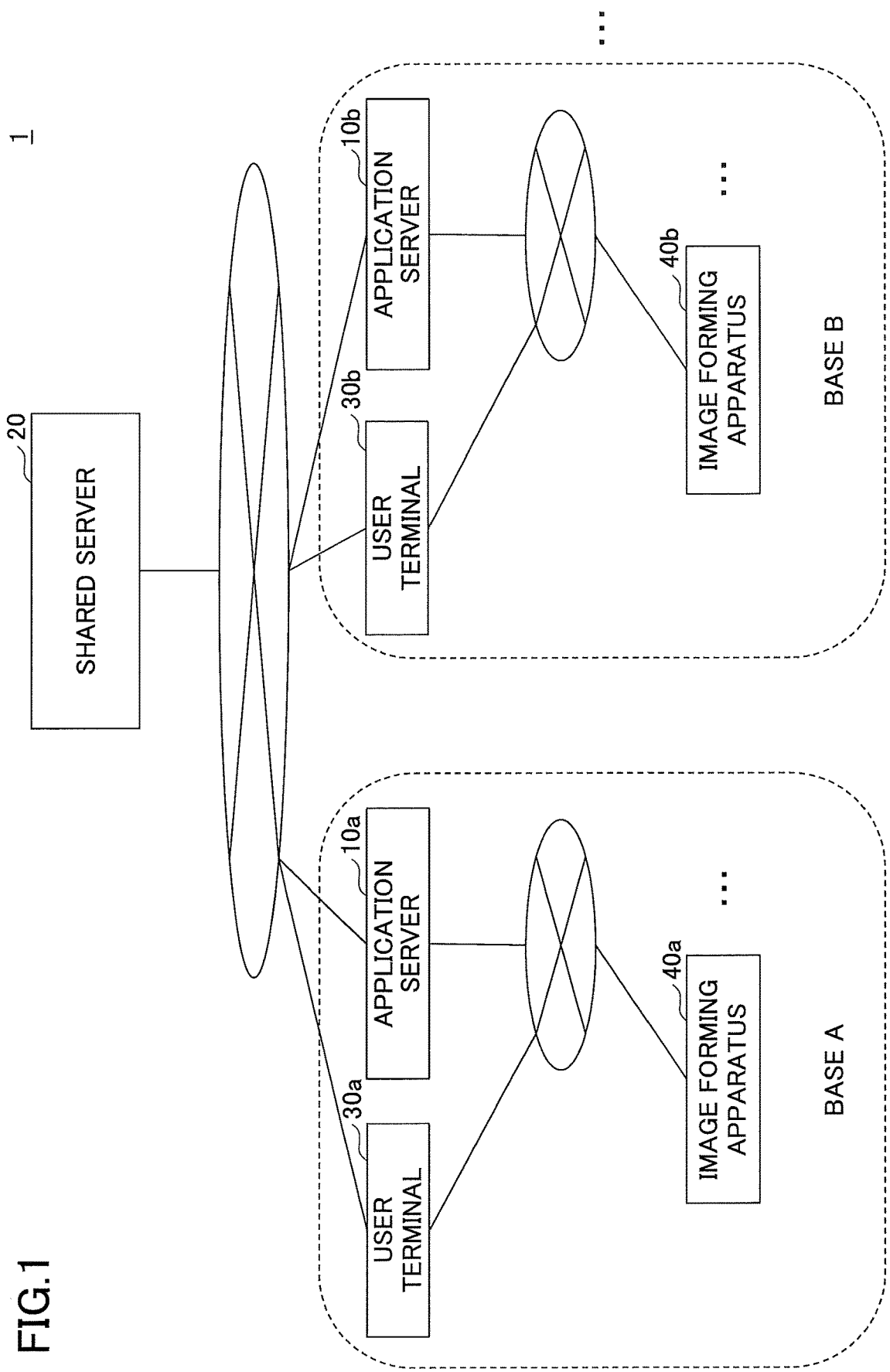
FIG. 1 is a diagram illustrating an example configuration of an information processing system according to an embodiment of the present invention.

FIG. 1 is a diagram illustrating an example configuration of an information processing system 1 according to an embodiment of the present invention. The information processing system 1 is configured to cover multiple bases (base A, base B, etc.) of a company (hereinafter referred to as "company R"). A base is established for each sales region of a product manufactured by company R. The base is also a development and sales base for an application program (hereinafter referred to as "application") run on an image forming apparatus 40 manufactured by company R. For example, a base may be established for each region including North America, Europe and Japan, for example. Also, within Japan, a base may be established for each smaller region, such as for each district or prefecture.

Each base includes an application server 10, at least one user terminal 30, and at least one image forming apparatus 40. The devices within each base are connected via a network such as the Internet. Note that in the following descriptions, the application server 10, the user terminal 30, and the image forming apparatus 40 at base A are respectively referred to as "application server 10a", "user terminal 30a", and "image forming apparatus 40a" (i.e., the character "a" is added at the end of the reference numerals). Similarly, the application server 10, the user terminal 30, and the image forming apparatus 40 at base B are respectively referred to as "application server 10b", "user terminal 30b", and "image forming apparatus 40b" (i.e., the character "b" is added at the end of the reference numerals). Further, when no distinction needs to be made between the different bases, the reference characters "a" and "b" may be omitted.

The image forming apparatus 40 is a device manufactured and sold by company R and is installed at a site of a customer of company R. The image forming apparatus 40 can communicate with the application server 10 of the regional base to which the image forming apparatus 40 belongs.

The application server 10 is configured by at least one computer that is used for developing and executing an application and/or creating and deploying a package relating to the image forming apparatus 40, for example. A package is a collection of one or more applications organized by a certain classification or criteria. In the present embodiment, applications are sold in package units. That is, a package is an example of a program product unit including one or more programs (applications).

In the present embodiment, an application is configured by a connection of programs that are referred to as components. Thus, an application includes information relating to the connection of components (hereinafter referred to as "flow") and information defining setting information for each component. A component refers to a componentized program that is executed on the application server 10. Specific examples of a component include a component for executing OCR (Optical Character Recognition) on image data (hereinafter referred to as "OCR component"), a component for authenticating a user, and a component for delivering data to a cloud storage (hereinafter referred to as "delivery component"). For example, when an application including an OCR component and a delivery component is installed in the image forming apparatus 40 and the image forming apparatus 40 is instructed to execute the application, the image forming apparatus 40 transmits image data obtained by scanning a document to the application server 10 of the regional base to which the image forming apparatus 40 belongs. The application server 10 then executes the components included in the application. That is, the application server 10 executes OCR on the image data and delivers text data generated by the OCR to the cloud storage.

The user terminal 30 is a terminal used by a user of the information processing system 1. A user of the information processing system 1 is someone that develops an application, creates a package, and/or sells an application to a customer. In other words, the user of the information processing system 1 is basically a person associated with company R. Note that a PC (Personal Computer), a smartphone, or a tablet terminal may be used as the user terminal 30, for example.

The application server 10 and the user terminal 30 at each base can communicate with a shared server 20 via a network such as the Internet.

The shared server 20 is configured by at least one computer that execute processes for enabling an application and/or a package individually developed or created at each base to be shared across multiple bases. Note that in the following descriptions, an application and a package may both be referred to as an "asset" when a distinction does not need to be made between the two.

Figure 2:
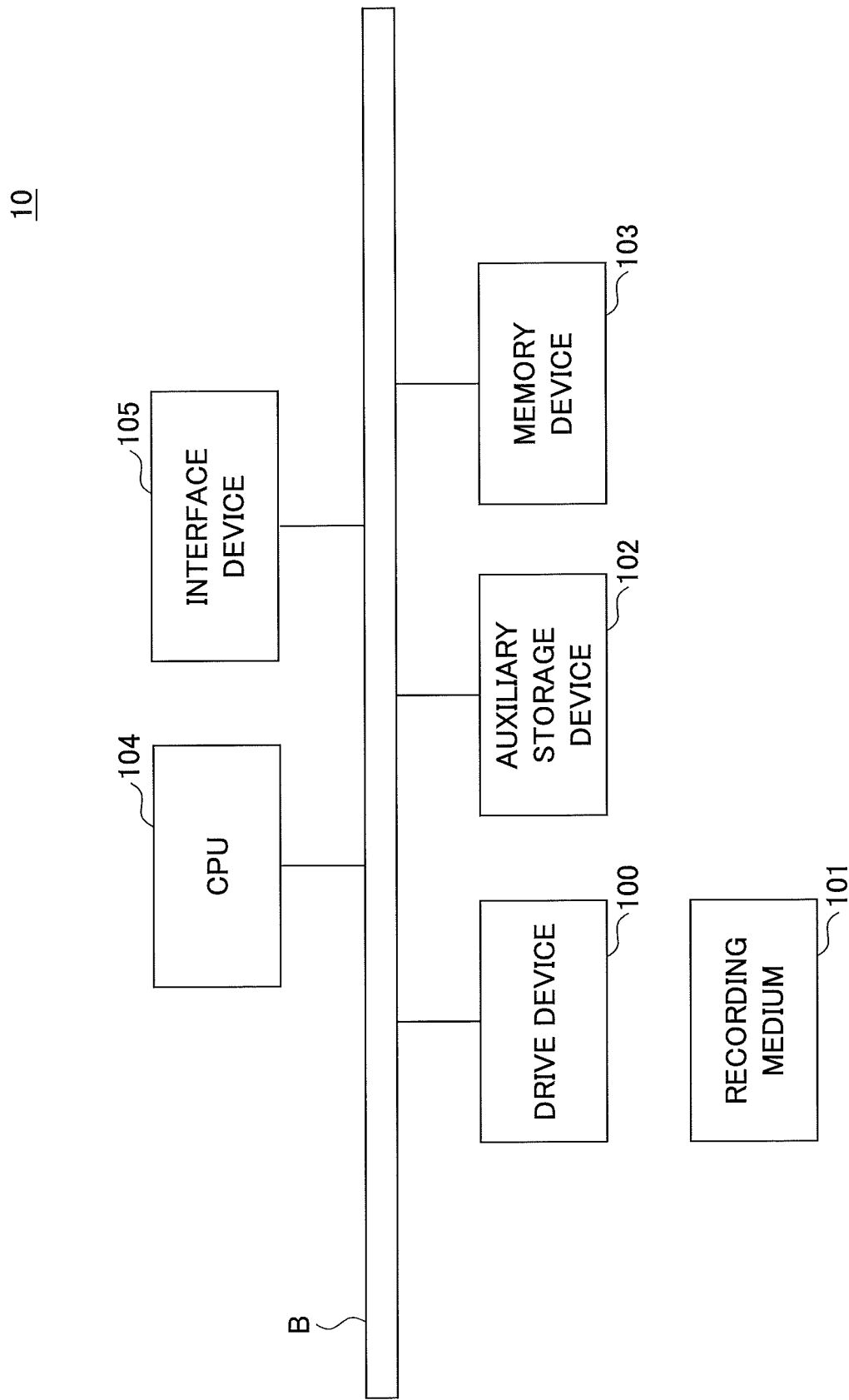
FIG. 2 is a diagram illustrating an example hardware configuration of an application server according to an embodiment of the present invention.

FIG. 2 is a diagram illustrating an example hardware configuration of the application server 10 according to an embodiment of the present invention. In FIG. 2, the application server 10 includes a drive device 100, an auxiliary storage device 102, a memory device 103, a CPU 104, and an interface device 105 that are connected to each other via a bus B.

A program for implementing processes in the application server 10 may be provided by a recording medium 101 such as a CD-ROM, for example. When the recording medium 101 storing the program is set in the drive device 100, the program may be installed from the recording medium 101 into the auxiliary storage device 102 via the drive device 100. Note, however, that the program does not necessarily have to be installed from the recording medium 101, and the program may also be downloaded from another computer via a network, for example. The auxiliary storage device 102 stores installed programs as well as relevant files and data, for example.

The memory device 103 reads a program from the auxiliary storage device 102 and stores the read program when an instruction to start the program is issued. The CPU 104 executes functions related to the application server 10 based on a program stored in the memory device 103. The interface device 105 is used as an interface for establishing connection with a network.

Note that the hardware configuration of the shared server 20 may be substantially identical to that of the application server 10 as illustrated in FIG. 2, for example.

Figure 3:
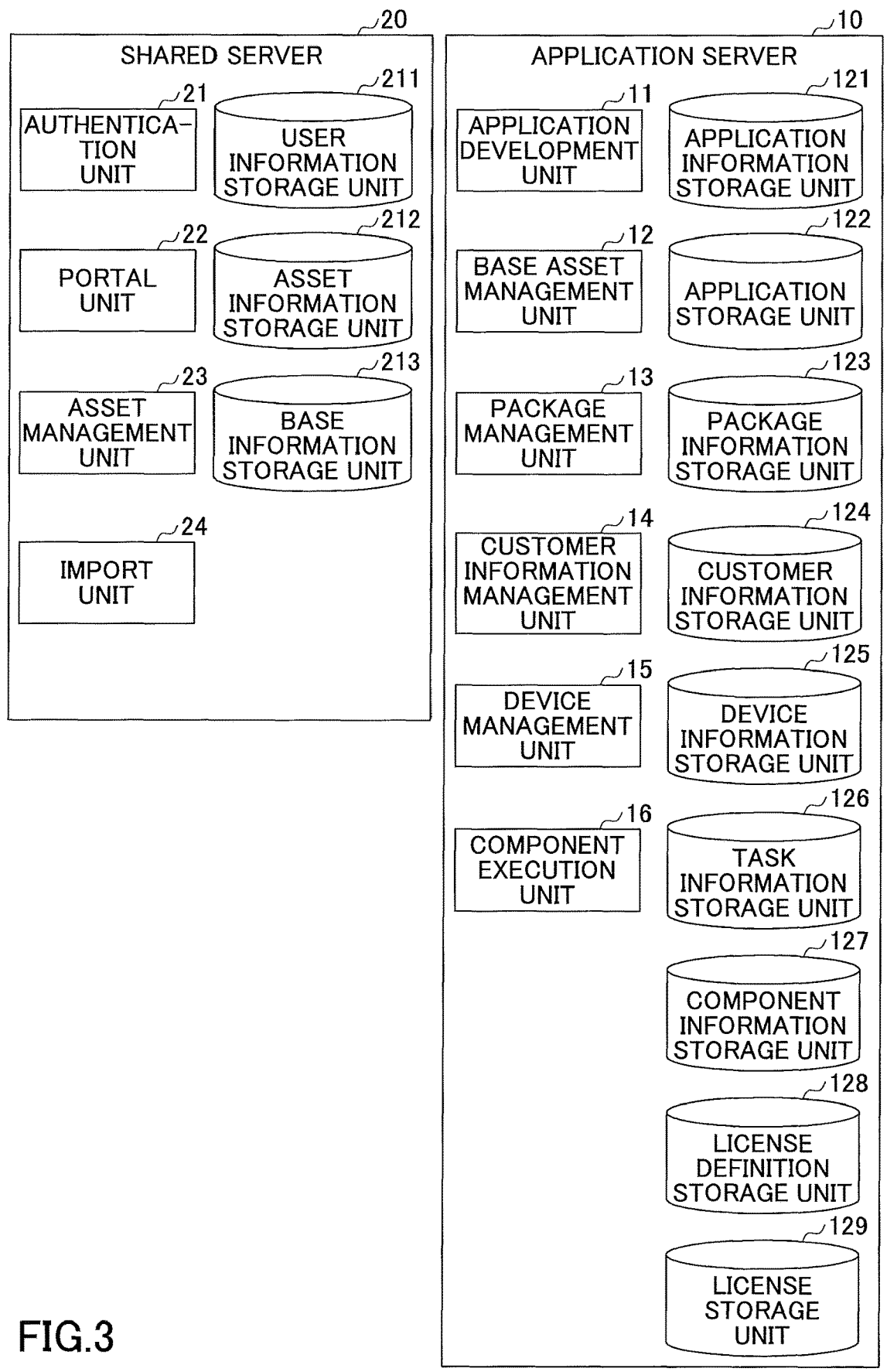
FIG. 3 is a diagram illustrating example functional configurations of the application server and a shared server according to an embodiment of the present invention.

FIG. 3 is a diagram illustrating example functional configurations of the application server 10 and the shared server 20 according to an embodiment of the present invention.

In FIG. 3, the application server 10 includes an application development management unit 11, a base asset management unit 12, a package management unit 13, a customer information management unit 14, a device management unit 15, and a component execution unit 16. Each of the above units may be implemented by the CPU 104 of FIG. 2 executing a process based on one or more programs installed in the application server 10, for example. The application server 10 also includes an application information storage unit 121, an application storage unit 122, a package information storage unit 123, a customer information storage unit 124, a device information storage unit 125, a task information storage unit 126, a component information storage unit 127, a license definition storage unit 128, and a license storage unit 129. Each of the above storage units may be implemented by the auxiliary storage device 102 or a storage device connectable to the application server 10 via a network, for example.

The application development management unit 11 supports development of an application at the base. The application information storage unit 121 stores application information including bibliographic information of an application that has been developed. The application storage unit 122 stores the developed application itself.

The base asset management unit 12 performs processes such as importing an application developed at another base, and releasing an application developed at its own base, for example. Note that importing an application refers to a process of receiving an application developed at another base and storing the received application in the application storage unit 122.

The package management unit 13 supports creation and editing of a package. The package information storage unit 123 stores package information relating to a package that has been created.

The customer information management unit 14 performs processes such as registering customer information in the customer information storage unit 124, and searching out customer information from the customer information storage unit 124, for example. The customer information storage unit 124 stores customer information of a customer in the region where the corresponding base of the application server 10 is established. In the present embodiment, a customer refers to a customer (purchaser) of company R. For example, an operator using the image forming apparatus 40 is a customer of company R.

The device management unit 15 manages each image forming apparatus 40 used by a customer of the corresponding base. For example, the device management unit 15 executes a process for installing a package in each image forming apparatus 40 managed at the corresponding base. The device information storage unit 125 stores information relating to each image forming apparatus 40 used by a customer of the corresponding base. The task information storage unit 126 stores information relating to a device management task, such as information on a specific package that should be installed in the image forming apparatus 40 of a specific customer, for example. The device management unit 15 manages the image forming apparatus 40 based on the information stored in the device information storage unit 125 and the task information storage unit 126.

The component execution unit 16 controls execution of components included in an application that has been selected at the image forming apparatus 40 as the application to be executed. The component information storage unit 127 stores information relating to each component.

The shared server 20 includes an authentication unit 21, a portal unit 22, an asset management unit 23, and an import unit 24. Each of the above units may be implemented by a CPU of the shared server 20 executing a process based on one or more programs installed in the shared server 20, for example. The shared server 20 also includes a user information storage unit 211, an asset information storage unit 212, and a base information storage unit 213. Each of the above storage units may be implemented by an auxiliary storage device of the shared server 20 or a storage device connectable to the shared server 20 via a network, for example.

The authentication unit 21 authenticates a user that is attempting to log into the information processing system 1. The user information storage unit 211 stores information relating to each user of the information processing system 1.

The portal unit 22 provides a virtual environment corresponding to a gateway to the information processing system 1.

The asset management unit 23 manages assets that are permitted to be released to other bases among the assets that have been developed at each base. The asset information storage unit 212 stores information relating to the assets.

The import unit 24 executes a process for making an application registered in the asset information storage unit 212 usable at a base other than the base at which the application has been developed and registered.

The base information storage unit 213 stores information relating to each base. For example, the base information storage unit 213 may store the IP address of the application server 10 of each base.

The license definition storage unit 128 stores license definition information associated with a package (hereinafter referred to as "license definition"). Note that multiple license definitions can be generated for one package.

The license storage unit 129 stores license data for a purchaser of a package (customer) that has been issued based on a license definition for the package.

Figure 4:
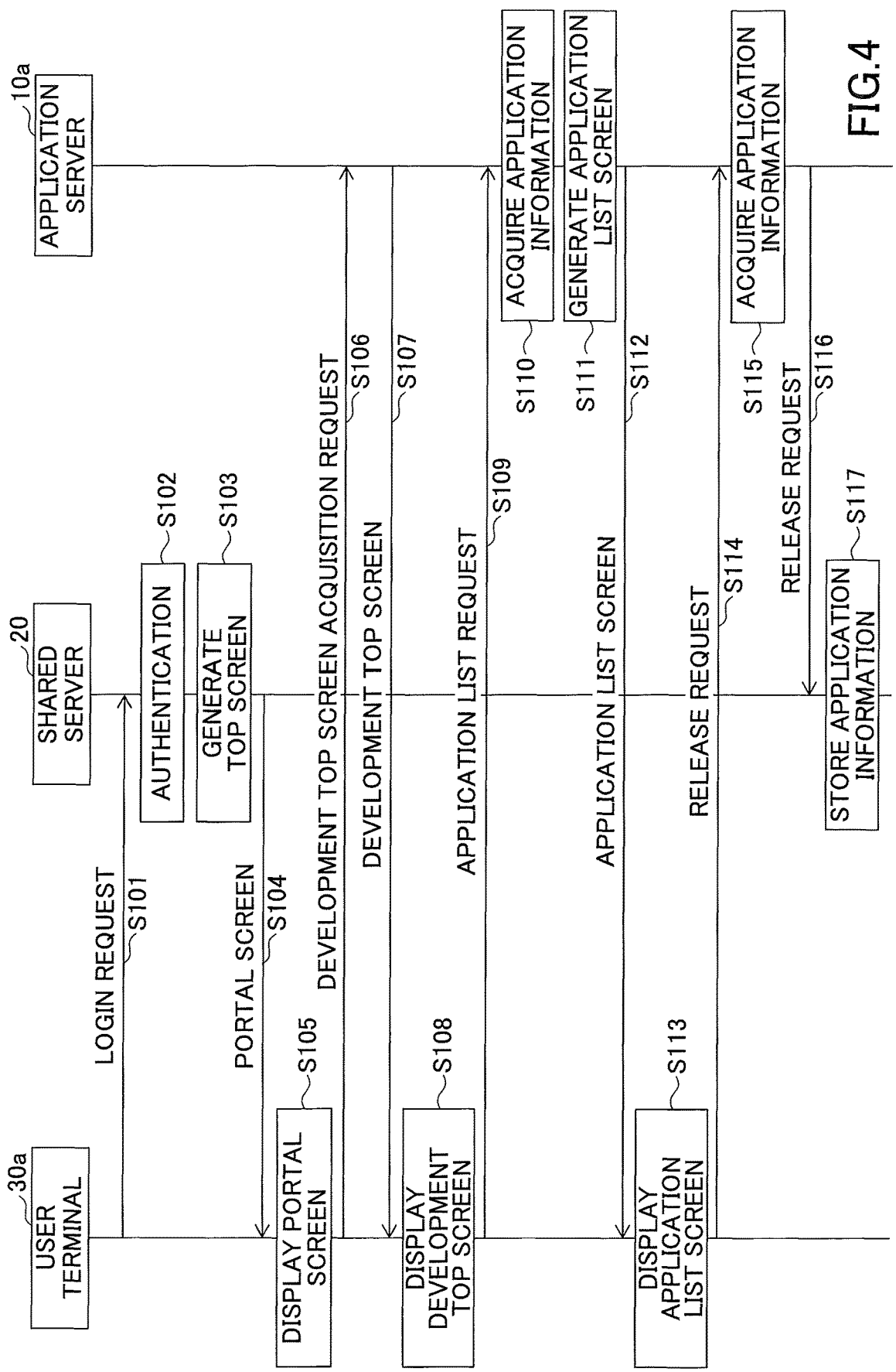
FIG. 4 is a sequence chart illustrating an example process sequence of an application release process.

In the following, process operations executed in the information processing system 1 are described. FIG. 4 is a sequence chart illustrating an example process sequence of an application release process. Note that FIG. 4 illustrates an example case where the application release process is executed with respect to base A. However, the application release process of FIG. 4 may similarly be executed with respect to other bases.

In the process of FIG. 4, a login screen to the shared server 20 is initially displayed on the user terminal 30a. When a user name and a password are input to the login screen, the user terminal 30a transmits a login request including the user name and the password to the shared server 20 (step S101).

Upon receiving the login request, the authentication unit 21 of the shared server 20 compares the user name and the password included in the login request with user names and passwords stored in the user information storage unit 211 to authenticate the user (step S102).

FIG. 5 is a table illustrating an example configuration of the user information storage unit 211. In FIG. 5, the user information storage unit 211 stores information items, such as "user name", "password", "name", and "affiliated base" for each user.

The "user name" is identification information for identifying each user. The "password" is the correct password for the user name. The "name" is the name of the user. The "affiliated base" is identification information identifying the base to which the user belongs (hereinafter referred to as "base ID").

If the user is successfully authenticated, the portal unit 22 generates a portal screen (step S103) and sends the generated portal screen to the user terminal 30a (step S104). In turn, the user terminal 30a displays the portal screen (step S105).

Figure 6:
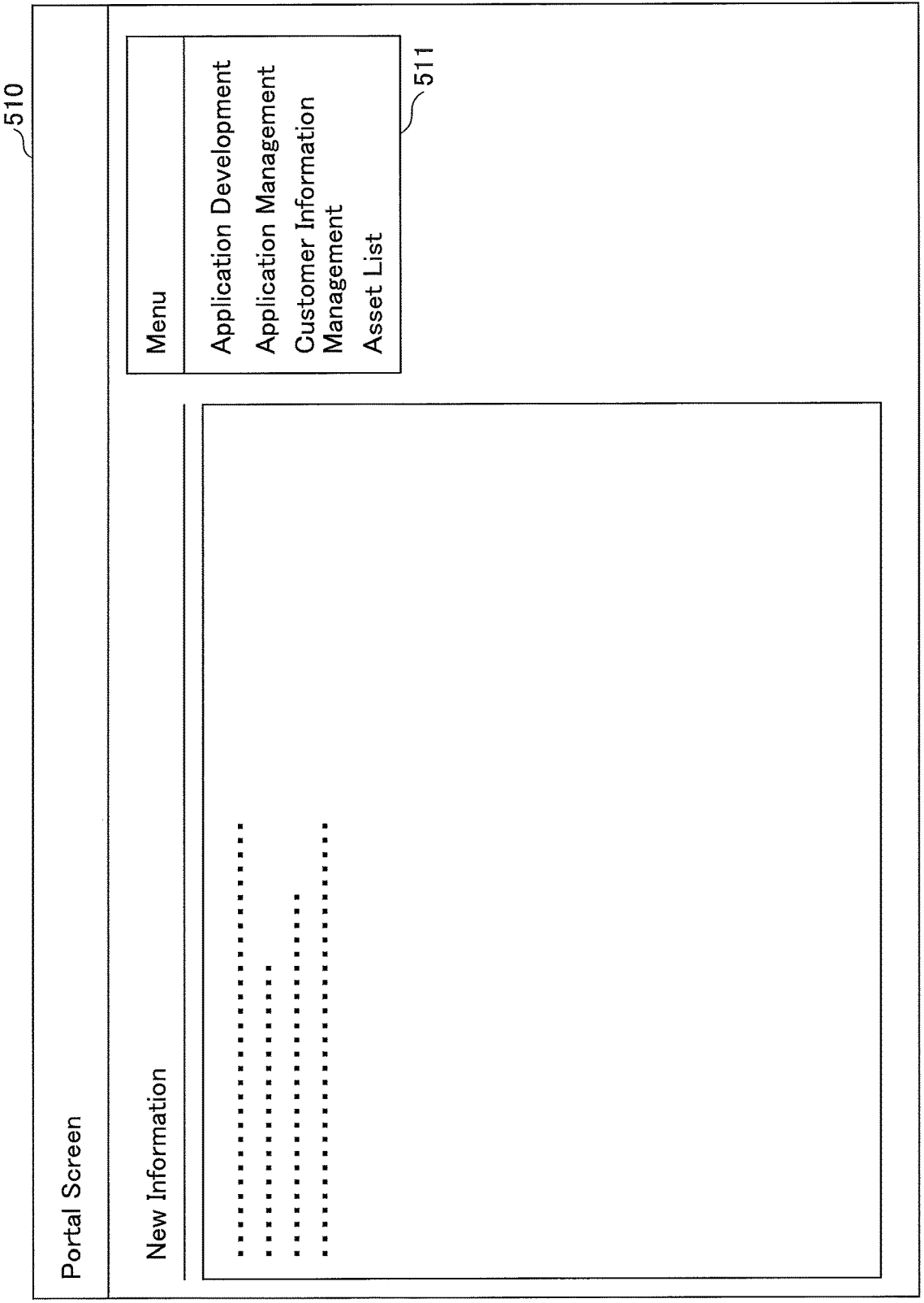
FIG. 6 is a diagram illustrating an example display of a portal screen.

FIG. 6 is a diagram illustrating an example display of a portal screen 510. In FIG. 6, the portal screen 510 includes a menu 511. The menu 511 includes menu items corresponding to work objectives to be selected by the user. For example, when releasing an application managed by the application server 10a, the user may select the menu item "application development" from the menu 511.

When the menu item "application development" is selected from the menu 511, the user terminal 30a transmits a development top screen acquisition request to the application server 10a that is set as the link destination for the menu item "application development" (step S106). That is, the portal unit 22 generates the portal screen 510 by setting a link to the application server 10 that is associated with the base ID of the logged-in user on the menu item "application development" in the menu 511.

In response to receiving the development acquisition request, the application development management unit 11 of the application server 10a transmits a development top screen to the user terminal 30a (step S107). In turn, the user terminal 30a displays the development top screen (step S108).

Figure 7:
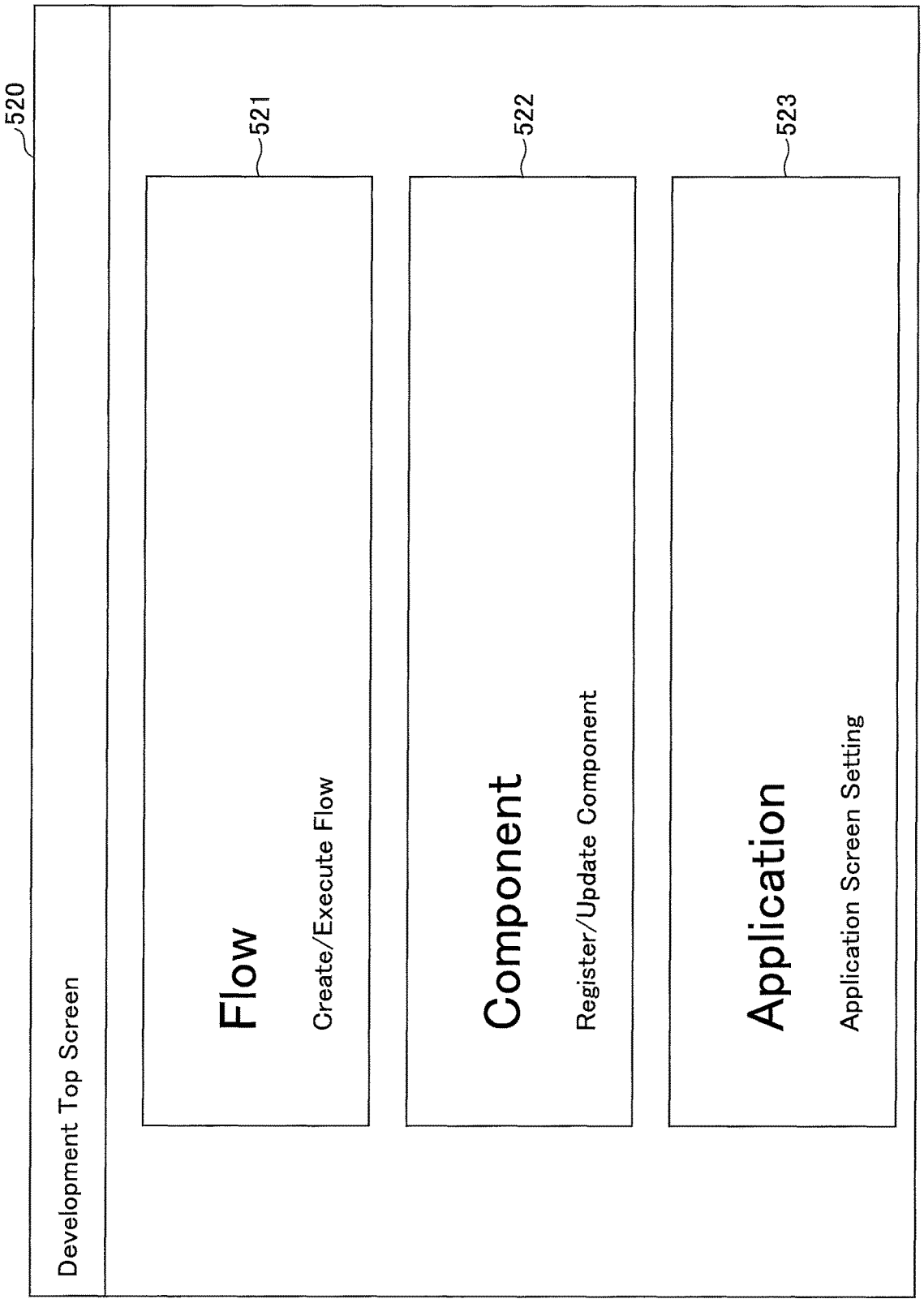
FIG. 7 is a diagram illustrating an example display of a development top screen.

FIG. 7 is a diagram illustrating an example display of a development top screen 520. In FIG. 7, the development top screen 520 includes buttons 521 to 523. The button 521 is a button for accepting flow creation instructions, for example. The button 522 is a button for accepting a registration or an update of a component, for example. The button 523 is a button for accepting screen settings of an application, for example.

When the button 521 or the button 523 is selected, the user terminal 30a transmits an application list acquisition request to the application server 10a (step S109). In response to the receiving the application list acquisition request, the application development management unit 11 of the application server 10a acquires an application information list from the application information storage unit 121 (step S110).

FIG. 8 is a table illustrating an example configuration of the application information storage unit 121. In FIG. 8, the application information storage unit 121 stores, for each application, information items including "application ID", "name", "icon", "function category", "developer", "language", "description", "registration date/time", "paid/free", "fee", and "release range".

The "application ID" is identification information for identifying each application. In the present embodiment, it is assumed that the application ID is identification information that uniquely identifies each application across multiple bases. Such identification information can be easily generated at each base by including the base ID as a part of the application ID, for example.

The "name" is the name of the application that is used for display, for example. The "icon" is an icon image used for displaying the application. The "function category" indicates the type of function provided by the application and may be used when searching for an application, for example. Specific examples of functional categories include scan, print, conversion, storage, mail, document analysis, construction industry, manufacturing industry, and medical care. Note that more than one function category may be set up for one application. The "developer" is the identification name of the developer of the application. The "language" indicates the language used in the application (e.g., English, Japanese). Note that more than one language may be designated as the language of an application. The "description" is a brief description of the application that may be in free form, for example. The "registration date/time" is the date/time the application was registered (stored in the application information storage unit 121 and the application storage unit 122). The "paid/free" is information indicating whether the application is a paid application or a free application. The "fee" is the fee of the application if the application is a paid application. The "release range" indicates the extent to which the application can be released. The release range may specify the base or the customer to which the application can be released, for example. That is, the release range may indicate a collection of one or more base IDs of bases to which release of the application is permitted and/or a collection of one or more customer IDs of customers to which release of the application is permitted. Note that the release range can be set for each application, and in this way, an application can be prevented from being released or leaked to a region unintended by the user, for example. Note that when there is no value indicated in the "release range" for an application, this means that there are no particular restrictions imposed on the release range of the corresponding application.

Note that in the application information acquisition process of step S110, all the application information stored in the application information storage unit 121 may be acquired, for example. Then, the application development management unit 11 generates an application list screen including a list of the acquired application information (step S111). Then, the application development management unit 11 transmits the generated application list screen to the user terminal 30a (step S112). In turn, the user terminal 30a displays the application list screen (step S113).

FIG. 9 is a diagram illustrating an example display of an application list screen 530. In FIG. 9, a part of the application information of each application is displayed on the application list screen 530.

When the user selects an application that is permitted to be released to another base and presses a release button 531, the user terminal 30a transmits a release request including the application ID of the selected application to the application server 10a (step S114). Note that multiple applications may be selected as applications to be released to another base.

Upon receiving the release request, the application development management unit 11 of the application server 10a acquires the application information identified by the application ID included in the release request from the application information storage unit 121 (step S115). Then, the application development management unit 11 transmits a release request including the acquired application information and the base ID of base A (release destination) to the shared server 20 (step S116).

Upon receiving the release request, the asset management unit 23 of the shared server 20 stores the application information and the base ID included in the release request in the asset information storage unit 212 (step S117).

FIG. 10 is a table illustrating an example configuration of the asset information storage unit 212. In FIG. 10, the asset information storage unit 212 stores, for each asset that has been released, information items including "asset ID", "name", "icon", "function category", "developer", "language", "description", "registration date/time", "paid/free", "fee", "release source", and "release range".

The "asset ID" is identification information for identifying each asset. If the asset is an application, the application ID of the application is set as the asset ID. If the asset is a package, identification information of the package (hereinafter referred to as "package ID") is set as an asset ID. The "name", "icon", "function category", "developer", "language", "description", "registration date/time", "paid/free", and "fee" may be the same as the corresponding information items of the application information storage unit 121 described above with reference to FIG. 8. Note, however, that the "registration date/time" of the asset information storage unit 212 indicates the date/time the asset was stored in the asset information storage unit 212. The "release source" indicates the base ID of the base from which the asset has been released. That is, the base ID received in step S117 is stored as the release source. The "release range" indicates the extent to which release of the asset is permitted. As with the release range of an application, the release range of an asset may specify one or more base IDs of bases and/or one or more customer IDs of customers to which release of the asset is permitted.

By executing the application release process of FIG. 4, applications developed at each base may be referenced from other bases. Note, however, that the shared server 20 does not store/manage an application itself. Thus, for example, by executing the application release process of FIG. 4, base B may be able to determine the existence of an application released by base A but cannot actually use the application. In order to make the application available at base B, a duplicate (copy) of the application developed at base A has to be provided to base B.

Figure 11:
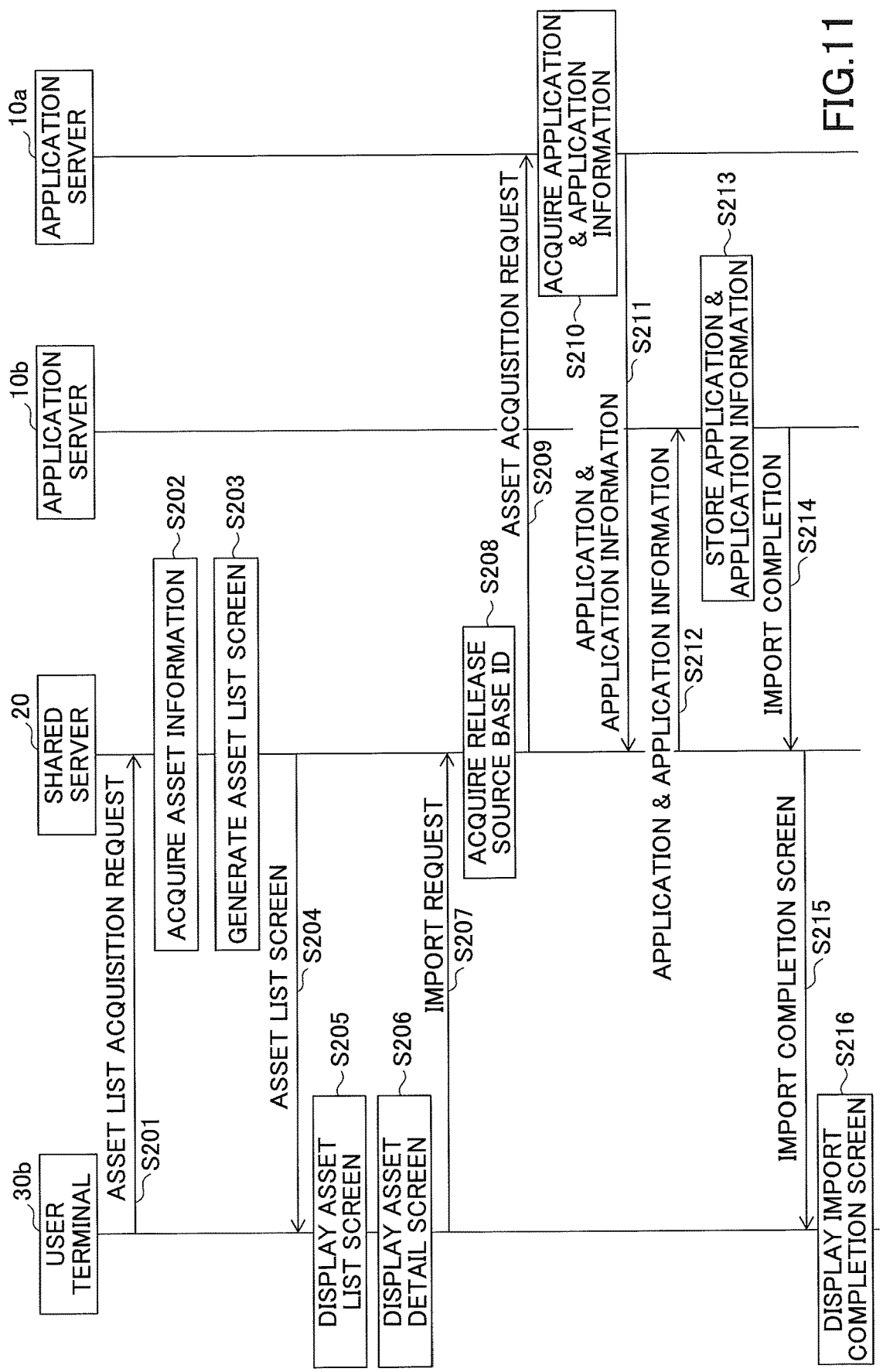
FIG. 11 is a sequence chart illustrating an example process sequence of an application import process.

FIG. 11 is a sequence chart illustrating an example process sequence of an application import process. In FIG. 11, an example application import process in which the user terminal 30b at base B imports the application released from base A by the application release process of FIG. 4 is be described. The process of FIG. 11 is executed in response to an instruction issued by a user of the user terminal 30b belonging to base B. Further, it is assumed that the portal screen 510 of FIG. 6 is initially displayed on the user terminal 30b in the application import process of FIG. 11. That is, it is assumed that steps S101 to S105 of FIG. 4 have been executed with respect to the user terminal 30b.

When the menu item "asset list" in the menu 511 of the portal screen 510 (FIG. 6) is selected by the user at base B, the user terminal 30b transmits an asset list acquisition request to the shared server 20 (step S201). Upon receiving the asset list acquisition request, the asset management unit 23 of the shared server 20 acquires a list of asset information from the asset information storage unit 212 of FIG. 10 (step S202). To acquire the list of asset information, the asset management unit 23 acquires asset information having the base ID of base B included in the release range. Then, the asset management unit 23 generates an asset list screen including the list of asset information (step S203). Then, the asset management unit 23 transmits the generated asset list screen to the user terminal 30b (step S204). In turn, the user terminal 30b displays the asset list screen (step S205).

FIG. 12 is a diagram illustrating an example display of an asset list screen 540. In FIG. 12, the asset list screen 540 includes a list area 541 and a filter area 542. The list area 541 displays a list of asset information. The filter area 542 accepts filter settings (search conditions) for specifying the asset information to be displayed in the list area 541. In FIG. 12, the asset information to be displayed can be narrowed down based on function category, developer, paid/free.

When any one of the asset information displayed in the list area 541 is selected, the user terminal 30b displays an asset detail screen for the asset corresponding to the selected asset information (hereinafter referred to as "target asset") based on a definition of the asset list screen 540 (step S206).

FIG. 13 is a diagram illustrating an example display of an asset detail screen 550. In FIG. 13, the asset detail screen 550 includes a detail area 551 and an import button 552. The detail area 551 displays configuration information of the asset information of the target asset that is not displayed in the list area 541 of the asset list screen 540. The import button 552 accepts an import instruction for importing the target asset.

When the import button 552 in the asset detail screen 550 is pressed, the user terminal 30b transmits an import request including the asset ID of the target asset to the shared server 20 (step S207). Upon receiving the import request, the asset management unit 23 of the shared server 20 acquires the base ID of the release source associated with the asset ID included in the import request from the asset information storage unit 212 (step S208). Then, the asset management unit 23 transmits an asset acquisition request including the asset ID (application ID in the present example) to the application server 10a associated with the acquired base ID (step S209). Note that the IP address of the application server 10 associated with each base ID is stored in the base information storage unit 213.

Upon receiving the asset acquisition request, the base asset management unit 12 of the application server 10a acquires the application identified by the application ID included in the asset acquisition request from the application storage unit 122, and also acquires application information associated with the application ID from the application information storage unit 121 (step S210). Then, the base asset management unit 12 transmits the application and the application information to the asset management unit 23 of the shared server 20 (step S211).

Upon receiving the application and the application information, the asset management unit 23 of the shared server 20 transmits the application and the application information to the application server 10b of base (base B) to which the login user of the user terminal 30b (sender of asset acquisition request) belongs (step S212). Note that the base to which the login user belongs can be identified based on the base ID stored in the user information storage unit 211 for the login user. Further, the IP address of the application server 10b associated with the base ID can be acquired from the base information storage unit 213.

Upon receiving the application and the application information, the base asset management unit 12 of the application server 10*b* stores the application in the application storage unit 122 of the application server 10*b* in association with the application ID included in the application information, and stores the application information in the application information storage unit 121 of the application server 10*b* (step S213). As a result, the application developed at base A can be imported to base B. Then, the base asset management unit 12 of the application server 10*b* transmits a notification indicating import completion to the shared server 20 (step S214).

Upon receiving the notification, the shared server 20 transmits an import completion screen to the user terminal 30*b* (step S215). In turn, the user terminal 30*b* displays the import completion screen (step S216).

Figure 14:
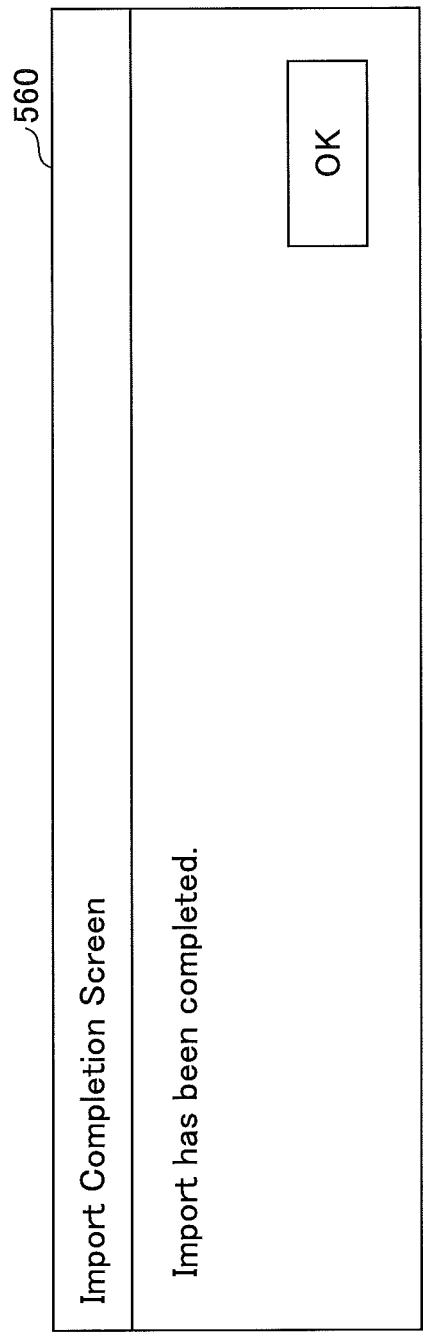
FIG. 14 is a diagram illustrating an example display of an import completion screen.

FIG. 14 is a diagram illustrating an example display of an import completion screen 560. In FIG. 14, the import completion screen 560 includes a message indicating that import has been completed.

Figure 15:
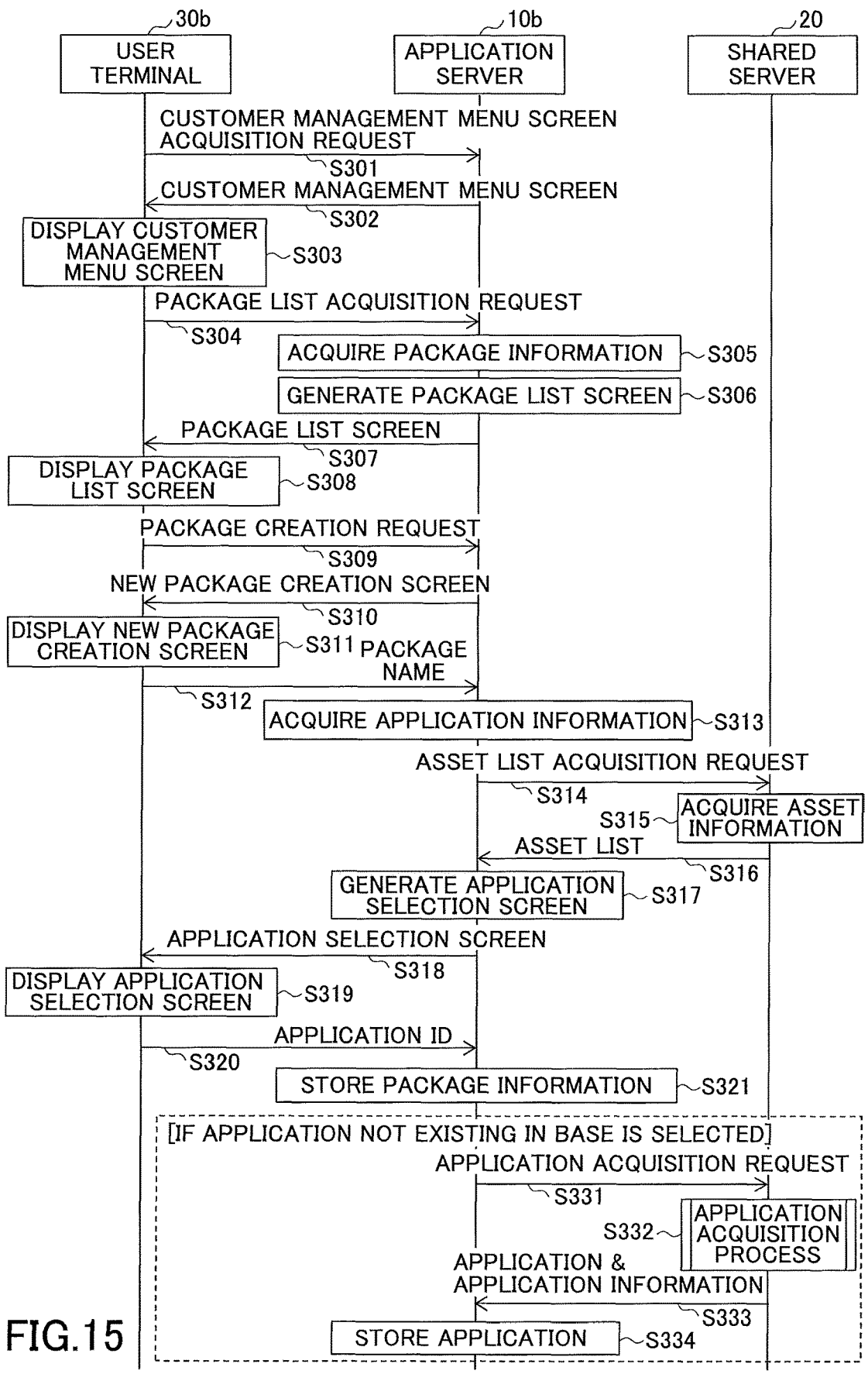
FIG. 15 is a sequence chart illustrating an example process sequence of a package creation process.
Figure 16:
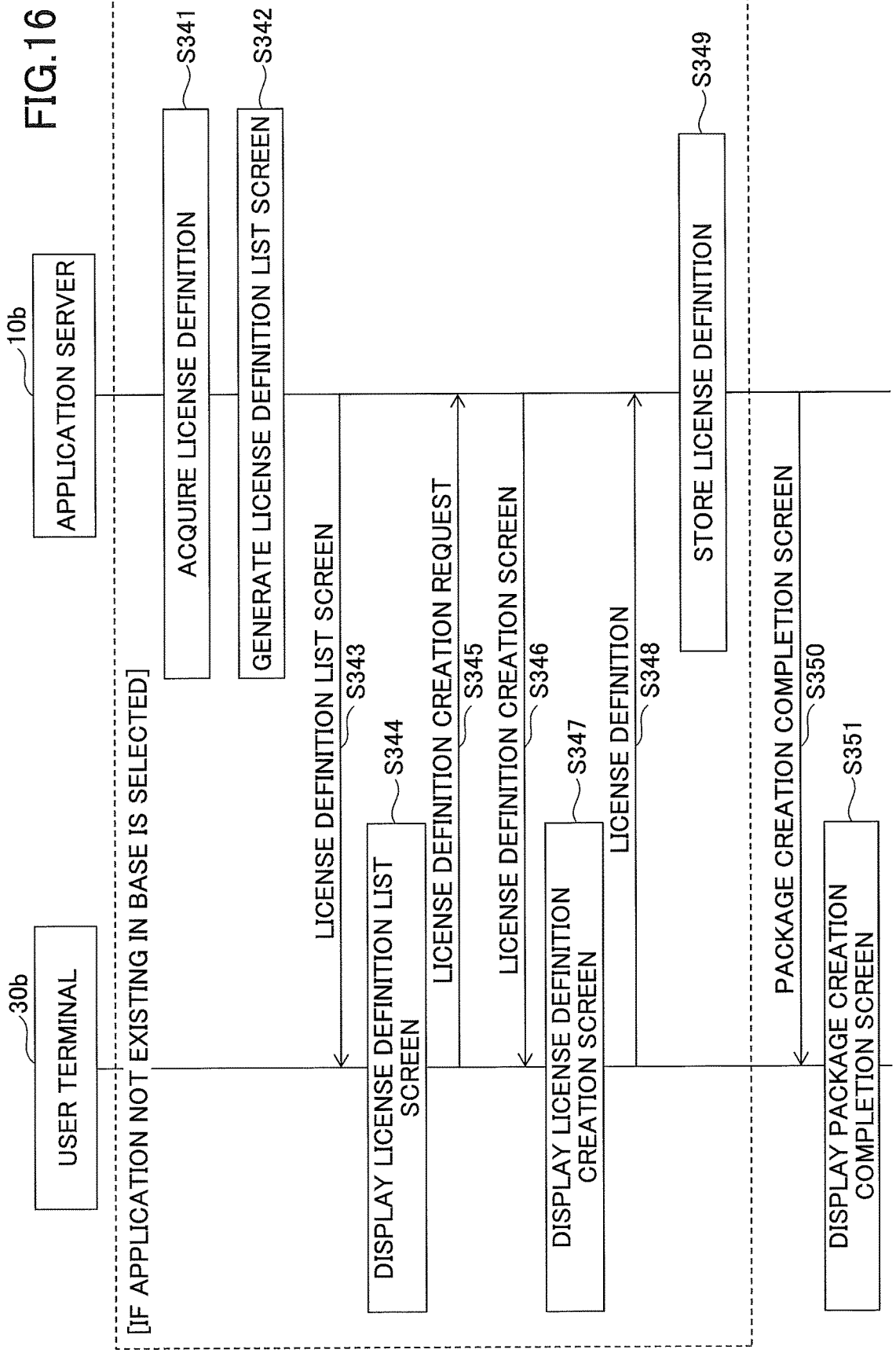
FIG. 16 is a sequence chart illustrating a further process sequence of the package creation process.

In the following, a process of creating a package is described. FIG. 15 and FIG. 16 are sequence charts illustrating an example process sequence of a package creation process. FIG. 15 illustrates an example case where a package is created at base B. As such, the process of FIG. 15 is executed in response an instruction issued by the user of the user terminal 30*b* at base B. Also, in the process of FIG. 15, it is assumed that the portal screen 510 of FIG. 6 is initially displayed on the user terminal 30*b*. That is, it is assumed that steps S101 to S105 of FIG. 4 have been executed with respect to the user terminal 30*b* before starting the process of FIG. 15.

When the menu item "customer information" in the menu 511 is selected by the user at base B, the user terminal 30*b* transmits a customer management menu screen acquisition request to the application server 10*b* that is set as the link destination for the menu item "customer information" (step S301). That is, the portal unit 22 creates a portal screen 510 by setting a link to the application server 10 associated with the user ID of the logged-in user on the menu item "customer information" in the menu 511.

Upon receiving the customer management menu screen acquisition request, the customer information management unit 14 of the application server 10*b* transmits a customer management menu screen to the user terminal 30*b* (step S302). In turn, the user terminal 30*b* displays the customer management menu screen (step S303).

Figure 17:
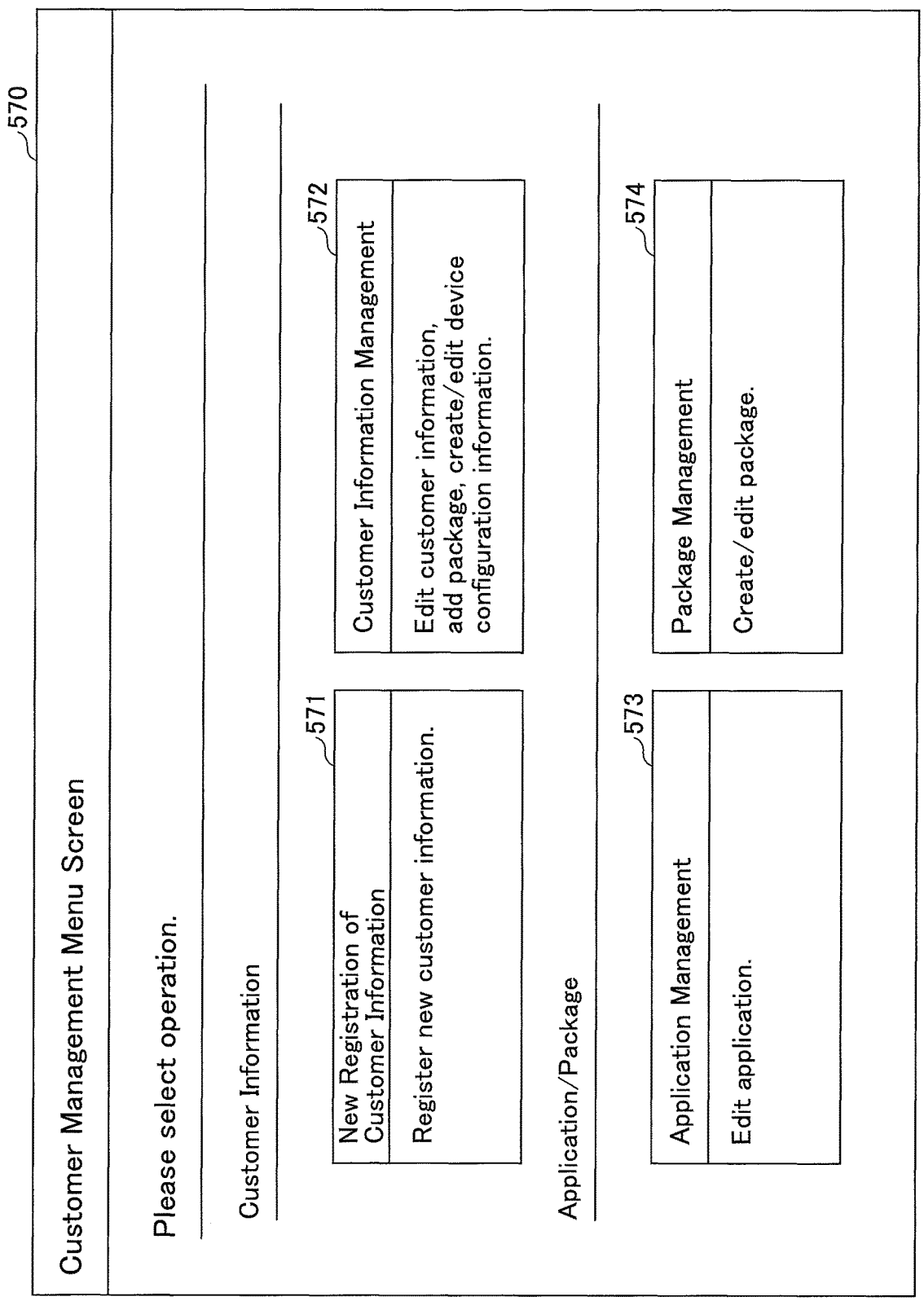
FIG. 17 is a diagram illustrating an example display of a customer management menu screen.

FIG. 17 is a diagram illustrating an example display of a customer management menu screen 570. In FIG. 17, the customer management menu screen 570 includes links 571 to 574.

When the link 574 is selected, the user terminal 30*b* transmits a package list acquisition request to the application server 10*b* (step S304). In response to receiving the package list acquisition request, the package management unit 13 of the application server 10*b* acquires a list of package information from the package information storage unit 123 (step S305).

FIG. 18 is a table illustrating an example configuration of the package information storage unit 123. In FIG. 18, the package information storage unit 123 stores information items including "package ID", "package name", "description", "application ID group", "release range", and "license control" for each package. The "package ID" is identification information for identifying the package. The "name" is the name of the package. The "description" is a description of the package. The "application ID group" is a group of application IDs of the applications included in the package. The "release range" indicates the release range of the package. The "license control" is information indicating the validity of license control of the package. That is, license control is information indicating whether or the package is subject to license control. The value for the "license control" may be either "valid" or "invalid". "Valid" means that the package is subject to license control. "Invalid" means that the package is not subject to license control.

In step S305, all package information stored in the package information storage unit 123 may be acquired. Then, the package management unit 13 generates a package list screen including a list of the acquired package information (step S306).

Then, the package management unit 13 transmits the generated package list screen to the user terminal 30*b* (step S307). In turn, the user terminal 30*b* displays the package list screen (step S308).

FIG. 19 is a diagram illustrating an example display of a package list screen 580. In FIG. 19, the package list screen 580 includes a package list area 581 and a create button 582. In the package list area 581 displays the package name and description for each package. The create button 582 accepts an instruction to create a new package.

When the user presses the create button 582, the user terminal 30*b* transmits a package creation request to the application server 10*b* (step S309). In response to receiving the package creation request, the package management unit 13 of the application server 10*b* transmits a new package creation screen to the user terminal 30*b* (step S310). In turn, the user terminal 30*b* displays the new package creation screen (step S311).

FIG. 20 is a diagram illustrating an example display of a new package creation screen 590. In FIG. 20, the new package creation screen 590 includes a package information input area 591 and a next button 592. The package information input area 591 accepts input of information items, such as a package name, a description, license control, and the release range of a package to be newly created. With respect to the release range, a method of designating the release range may be selected from a drop-down menu, for example. In FIG. 20, "base designation" is selected as the method of designating the release range, and a check box is indicated for each base that can be designated. In this case, the release range can be designated by specifying a base to which the package can be released. As another designation method, "customer designation" may be selected, for example. In this case, the release range of the package may be designated by specifying one or more customer IDs of customers to which the package can be released.

When package information is input to the package information input area 591 and the next button 592 is pressed, the user terminal 30*b* transmits the input package information to the application server 10*b* (step S312).

Upon receiving the package information, the package management unit 13 of the application server 10*b* stores the package information. Then, the package management unit 13 acquires a list of application information from the application information storage unit 121 of the application server 10*b* (step S313). Then, the package management unit 13 transmits an asset list acquisition request to acquire a list of asset information to the shared server 20 (step S314). The asset list acquisition request includes the base ID of base B. In response to receiving the asset list acquisition request, the asset management unit 23 of the shared server 20 acquires from the asset information storage unit 212, a list of asset information of assets having the base ID of base B included in the release range (i.e., assets that are permitted to be released to base B) (step S315), and transmits the acquired asset list to the application server 10*b* (step S316).

Upon receiving the asset list, the package management unit 13 of the application server 10*b* generates an application selection screen based on the asset list and the application information list acquired in step S313 (step S317). More specifically, the package management unit 13 generates an application selection screen including, as selection options, the applications managed by the application server 10*b* and applications released to the shared server 20. Then, the package management unit 13 transmits the generated application selection screen to the user terminal 30*b* (step S318). In turn, the user terminal 30*b* displays the application selection screen (step S319).

Figure 21:
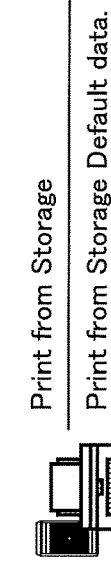
FIG. 21 is a diagram illustrating an example display of an application selection screen.

FIG. 21 is a diagram illustrating an example display of an application selection screen 610. In FIG. 21, the application selection screen 610 includes application information of each application that is displayed as an option. In the illustrated example, the options include application information managed at base B and application information released to the shared server 20. Also, the application information managed at base B includes the application information imported from base A by executing the application import process of FIG. 11. In this way, according to an aspect of the present embodiment, a package including not only an application developed at base B but also an application developed at another base can be created.

When one or more applications are selected by the user and the create button 611 is pressed, the user terminal 30*b* transmits the application ID group of the application IDs of the selected applications to the application server 10*b* (step S320). The package management unit 13 of the application server 10*b* adds the received application ID group to the package information stored in step S312 and stores the package information with the added application ID group in the package information storage unit 123 (step S321). At this time, the package management unit 13 generates a new package ID and assigns the package ID to the newly stored package information. In the following descriptions, a package associated with package information that is newly stored in the package information storage unit 123 is referred to as "target package".

Note that in the case where the application ID group received in step S320 includes an application ID that is not stored in the application information storage unit 121 of the application server 10*b* (hereinafter referred to as "shared application ID"); that is, in the case where an application ID included in the asset information acquired from the shared server 20 is included in the application group ID, the process proceeds to step S331 and subsequent process steps in order to have the application included in the package automatically imported to the application server 10*b*.

In step S331, the base asset management unit 12 of the application server 10*b* transmits an application acquisition request including the shared application ID to the shared server 20. The asset management unit 23 of the shared server 20 executes an application acquisition process for acquiring the application with the shared application ID (step S332). The application acquisition process is a process corresponding to steps S209 to S211 of FIG. 11. That is, the actual application and the application information of the application are acquired from the release source of the application identified by the shared application ID.

Then, the asset management unit 23 transmits the application and the application information to the application server 10*b* (step S333). Upon receiving the application and the application information, the base asset management unit 12 of the application server 10*b* stores the application in the application storage unit 122 of the application server 10*b* in association with the application ID included in the application information, and stores the application information in the application information storage unit 121 of the application server 10*b* (step S334). Note that the processes of steps S333 and S334 are substantially the same as the processes of steps S212 and S213 of FIG. 11.

Then, if the license control of the target package is "valid", the process proceeds to step S341 of FIG. 16. In step S341 of FIG. 16, the package management unit 13 of the application server 10*b* acquires a list of license definitions stored in the license definition storage unit 128 of the application server 10*b*.

FIG. 22 is a table illustrating an example configuration of the license definition storage unit 128. In FIG. 22, the license definition storage unit 128 stores, for each license definition, information items including "license definition ID", "license definition name", "validity period", "package ID", and "validity status". The "license definition ID" is identification information for identifying each license definition. The "license definition name" is the name of the license definition. The "valid period" is the validity period of the license issued based on the license definition. In the present embodiment, a number of months (1 to 60 months), a number of days (1 to 30 days), or "unlimited" can be set up as the validity period. However, a number of years or a period based on some other time unit may also be used to indicate the validity period. The "package ID" is the package ID of the package to which the license definition is applied. The "validity status" is information indicating the validity of the license definition. That is, a value for the "validity status" may be either "valid" or "invalid". "Valid" means that license data can be issued using the license definition. "Invalid" means that license data cannot be issued using the license definition.

In step S341, all the license definitions stored in the license definition storage unit 128 may be acquired.

Then, the package management unit 13 generates a license definition list screen including a list of acquired license definitions (existing license definitions) (step S342). Then, the package management unit 13 transmits the license definition list screen to the user terminal 30*b* (step S343). In turn, the user terminal 30*b* displays the license definition list screen (step S344).

Figure 23:
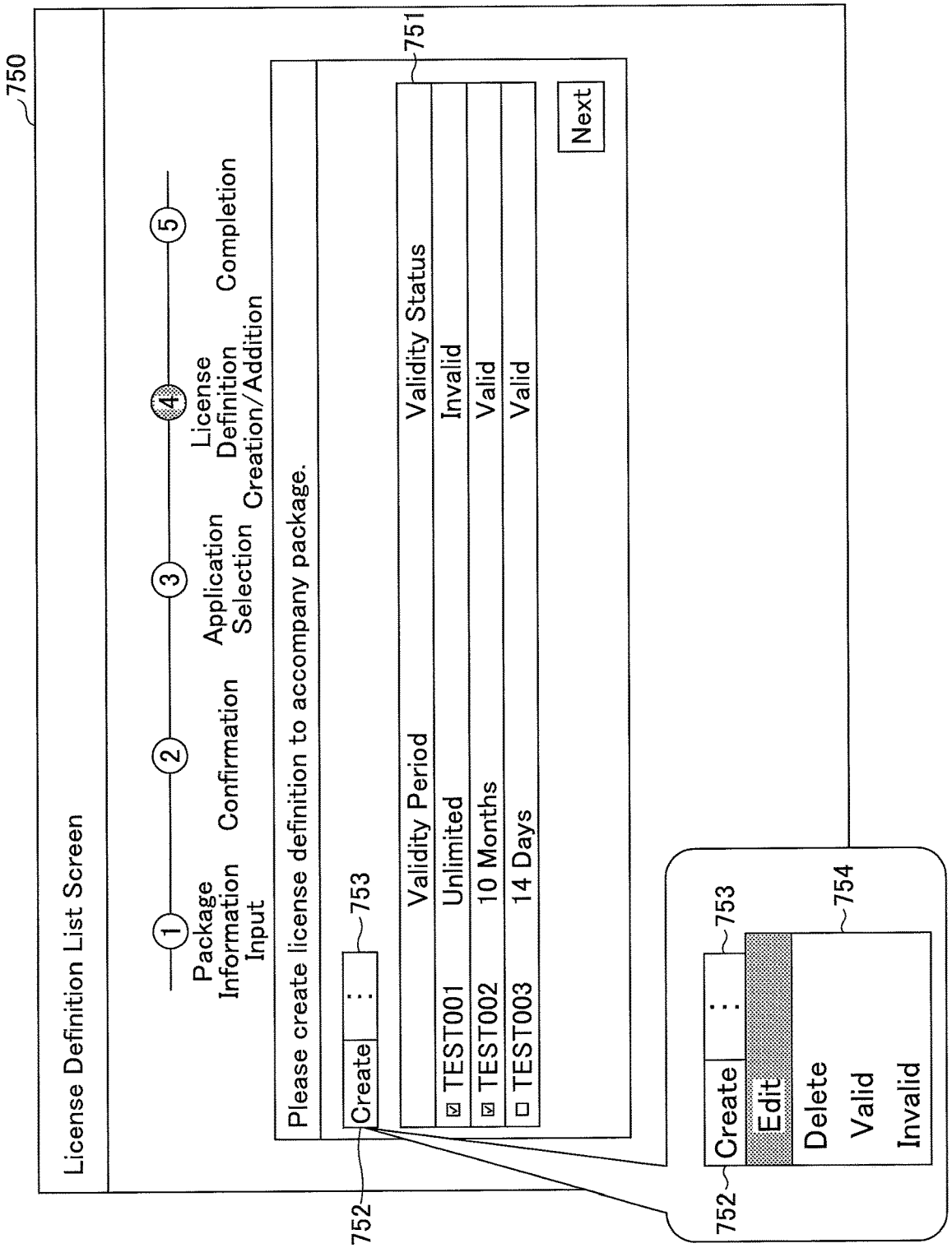
FIG. 23 is a diagram illustrating an example display of a license definition list screen.

FIG. 23 is a diagram illustrating an example display of a license definition list screen 750. In FIG. 23, the license definition list screen 750 includes a license definition list area 751, a create button 752, and a button 753. The license definition list area 751 displays the license definition ID, the validity period, and the validity status of each existing license definition. The create button 752 is a button for accepting an instruction to create a new license definition.

When the user presses the create button 752, the user terminal 30*b* transmits a license definition creation request to the application server 10*b* (step S345). In response to receiving the license definition creation request, the package management unit 13 of the application server 10*b* transmits a license definition creation screen to the user terminal 30*b* (step S346). In turn, the user terminal 30*b* displays the license definition creation screen (step S347).

FIG. 24 is a diagram illustrating an example display of a license definition creation screen 760. In FIG. 24, the license definition creation screen 760 includes a license definition input area 761 and a button 762. The license definition input area 761 is an area for accepting a value for each information item included in the license definition.

When the information items of the license definition are input to the license definition input area 761 and the button 762 is pressed, the user terminal 30b transmits the input license definition to the application server 10b (step S348).

Upon receiving the license definition, the package management unit 13 of the application server 10b stores (registers) the received license definition in the license definition storage unit 128 (step S349). Note that the package ID of the target package is set (registered) in the package ID of the license definition.

Then, the package management unit 13 transmits a package creation completion screen to the user terminal 30b (step S350). In turn, the user terminal 30b displays the package creation completion screen (step S351).

Figure 25:
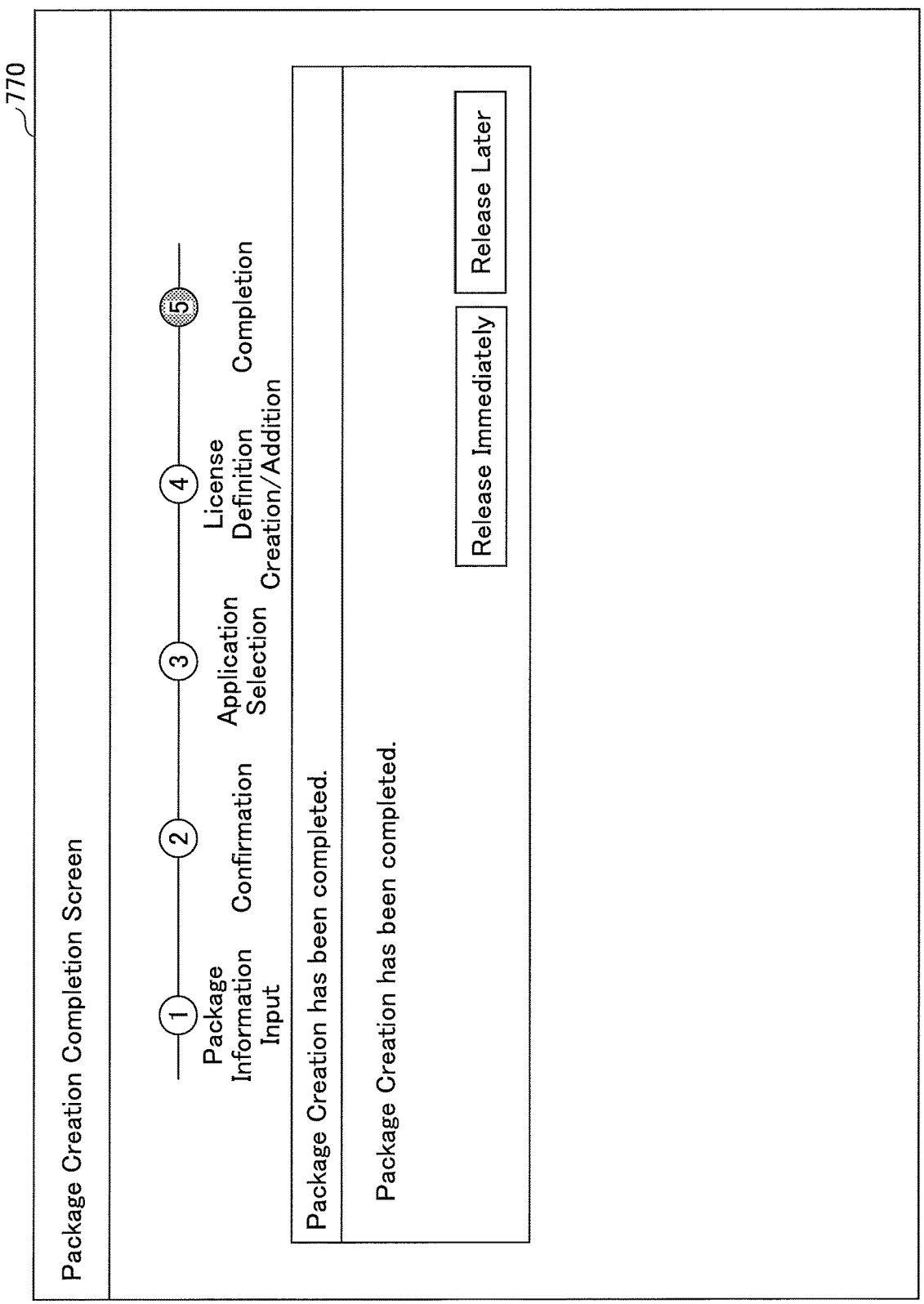
FIG. 25 is a diagram illustrating an example display of a package creation completion screen.

FIG. 25 is a diagram illustrating an example display of a package creation completion screen 770. In FIG. 25, the package creation completion screen 770 displays a message indicating that creation of the package has been completed. Note that if the license control of the target package is "invalid", the processes of steps S350 and S351 of FIG. 16 are executed after the process of step S334 of FIG. 15.

As can be appreciated from FIG. 22, for example, multiple license definitions may be created for one package, and multiple license definition IDs may be associated with one package ID. That is, after the process of step S344 of FIG. 16, the process of creating and registering a new license definition can be executed multiple times with respect to the same package.

Also, as indicated in the balloon of FIG. 23, when the button 753 on the license definition list screen 750 is pressed, a menu 754 is displayed. The menu 754 is a menu for accepting an operation with respect to a license definition that is selected (checked) in the license definition list area 751.

For example, when "delete" is selected from the menu 754, the user terminal 30b transmits a deletion request including the license definition ID of the selected license definition to the application server 10b. In turn, the package management unit 13 of the application server 10b deletes the license definition associated with the license definition ID from the license definition storage unit 128.

When "valid" or "invalid" is selected from the menu 754, the user terminal 30b transmits a validity status change request including the license definition ID of the selected license definition to the application server 10b. In turn, the package management unit 13 of the application server 10b changes the validity status of the license definition associated with the license definition ID in the license definition storage unit 128 to the selected status (i.e., "valid" or "invalid").

Further, when "edit" is selected from the menu 754, the user terminal 30b displays a license definition edit screen.

FIG. 26 is a diagram illustrating an example display of a license definition edit screen 780. In FIG. 26, the license definition edit screen 780 includes a license definition edit area 781 and a button 782. The license definition edit area 781 is an area for displaying the value of each information item constituting the license definition selected in the license definition list area 751 of the license definition list screen 750 and for accepting a change to the value. When the license definition is changed in the license definition edit area 781 and the button 762 is pressed, the user terminal 30b transmits the changed license definition to the application server 10b. As a result, the same processes as those of step S349 and subsequent steps of FIG. 16 are executed so that the change in the selected license definition is reflected in the license definition storage unit 128.

As described above, according to an aspect of the present embodiment, a license definition can be defined for each package, and in this way, a suitable license definition according to the business mode of a customer may be created, for example. Also, according to an aspect of the present embodiment, a license definition may be created in a navigation-style process in the course of executing a package creation process, and in this way, a product designer can create a license definition while designing a package (product), for example. Also, according to an aspect of the present embodiment, multiple license definitions can be generated for one package, and in this way, accommodations may be made with respect to various business models.

In the following, a process that is executed when the link 573 in the customer management menu screen 570 of FIG. 17 is selected is described.

Figure 27:
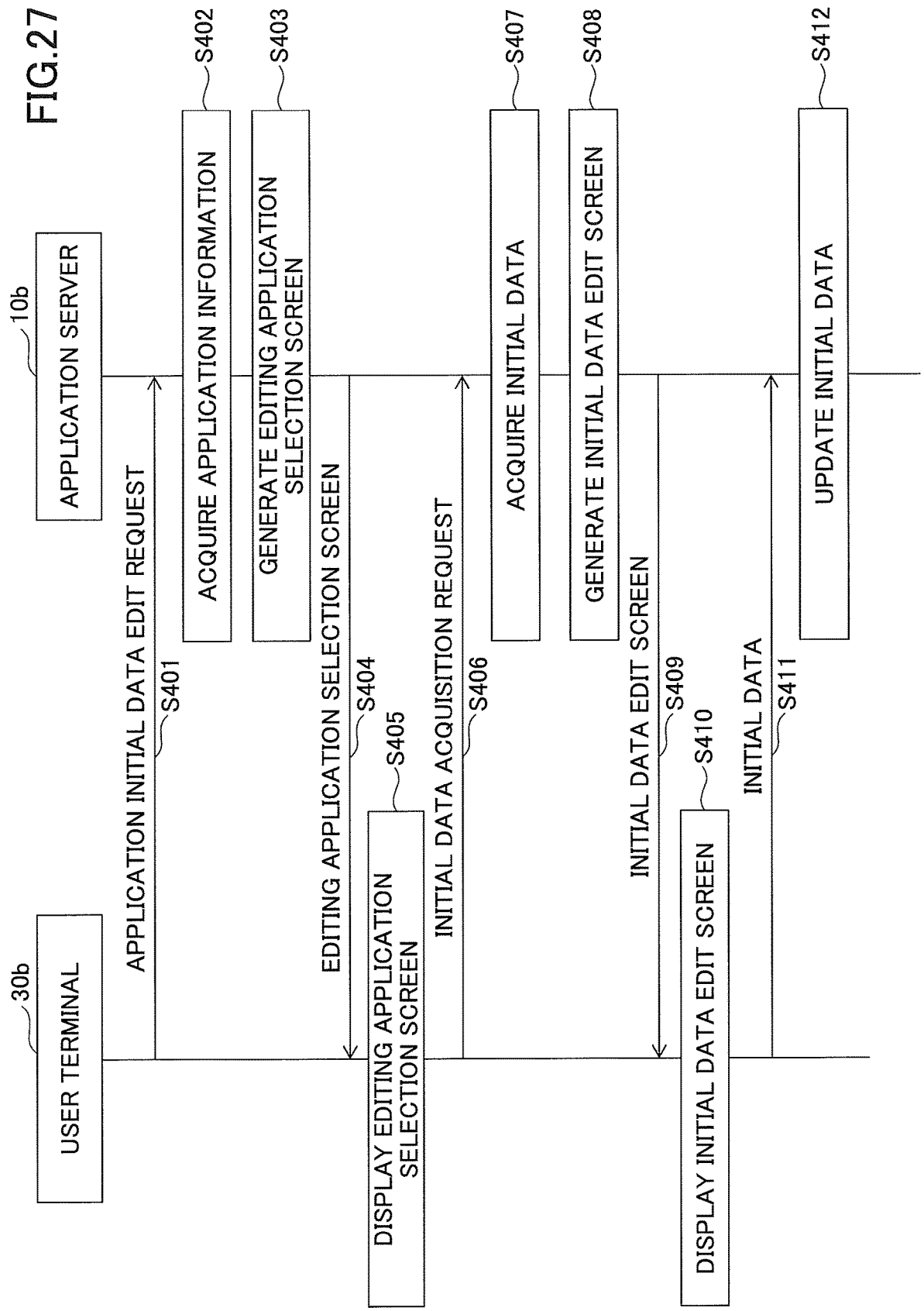
FIG. 27 is a sequence chart illustrating an example process sequence of an application initial data creation process.

FIG. 27 is a sequence chart illustrating an example process sequence of an application initial data creation process.

When the link 573 in the customer management menu screen 570 of FIG. 17 is selected, the user terminal 30b transmits an application initial data edit request to the application server 10b (step S401). Application initial data includes an application name, an icon, and setting information for each component constituting the application. Note that "initial" is synonymous with "default". That is, initial data corresponds to data including setting information created as a default setting at the time an application was created.

A package is created with an industry or a target customer specified to some extent. In this case, a product that is more appealing to the target customer may be created by using terms relevant to the industry of the target customer for which the package is created to describe the names of the applications and icons of the package rather than using terms merely describing the functions of the applications, for example. Accordingly, in the present embodiment, the initial data of each application can be edited.

In response to receiving the application initial data edit request, the application development management unit 11 of the application server 10b acquires a list of application information from the application information storage unit 121 (step S402). Then, the application development management unit 11 generates an editing application selection screen for enabling selection of the application that is to have its initial data edited from the application list (step S403). Then, the application development management unit 11 transmits the editing application selection screen to the user terminal 30b (step S404). In turn, the user terminal 30b displays the editing application selection screen (step S405).

Figure 28:
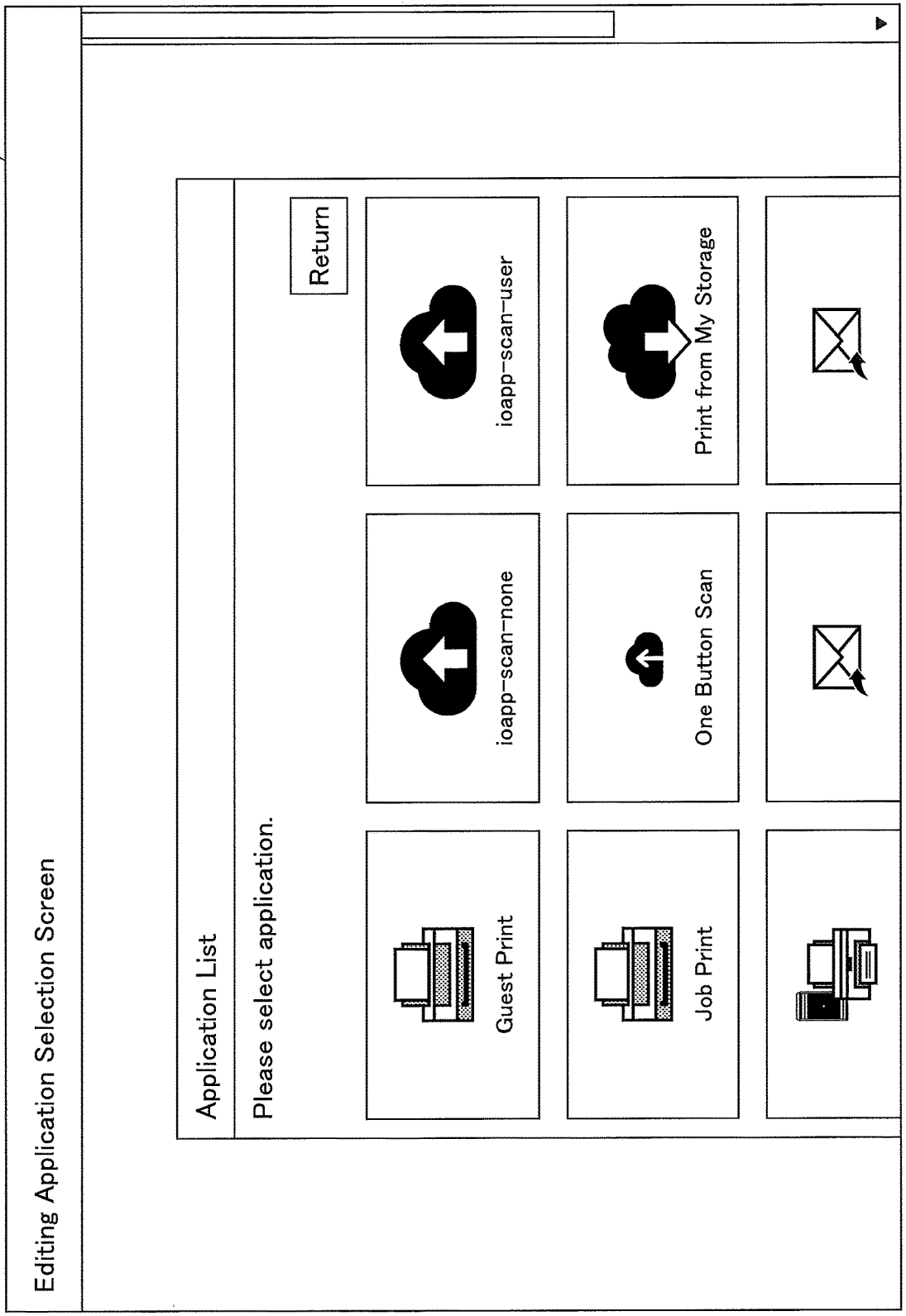
FIG. 28 is a diagram illustrating an example display of an edit application selection screen.

FIG. 28 is a diagram illustrating an example display of an editing application selection screen 620. In FIG. 28, the editing application selection screen 620 has icons of the applications managed at base B arranged to be selectable.

When any one of the applications is selected by the user, the user terminal 30b transmits an initial data acquisition request including the application ID of the selected application to the application server 10b (step S406). Upon receiving the acquisition request, the application development management unit 11 of the application server 10b acquires the initial data of the application corresponding to the application ID included in the acquisition request from the application storage unit 122 (step S407). Then, the application development management unit 11 generates an initial data edit screen for accepting edits to the initial data (step S408). Then, the application development management unit 11 transmits the initial data edit screen to the user terminal 30b (step S409). In turn, the user terminal 30b displays the initial data edit screen (step S410).

Figure 29:
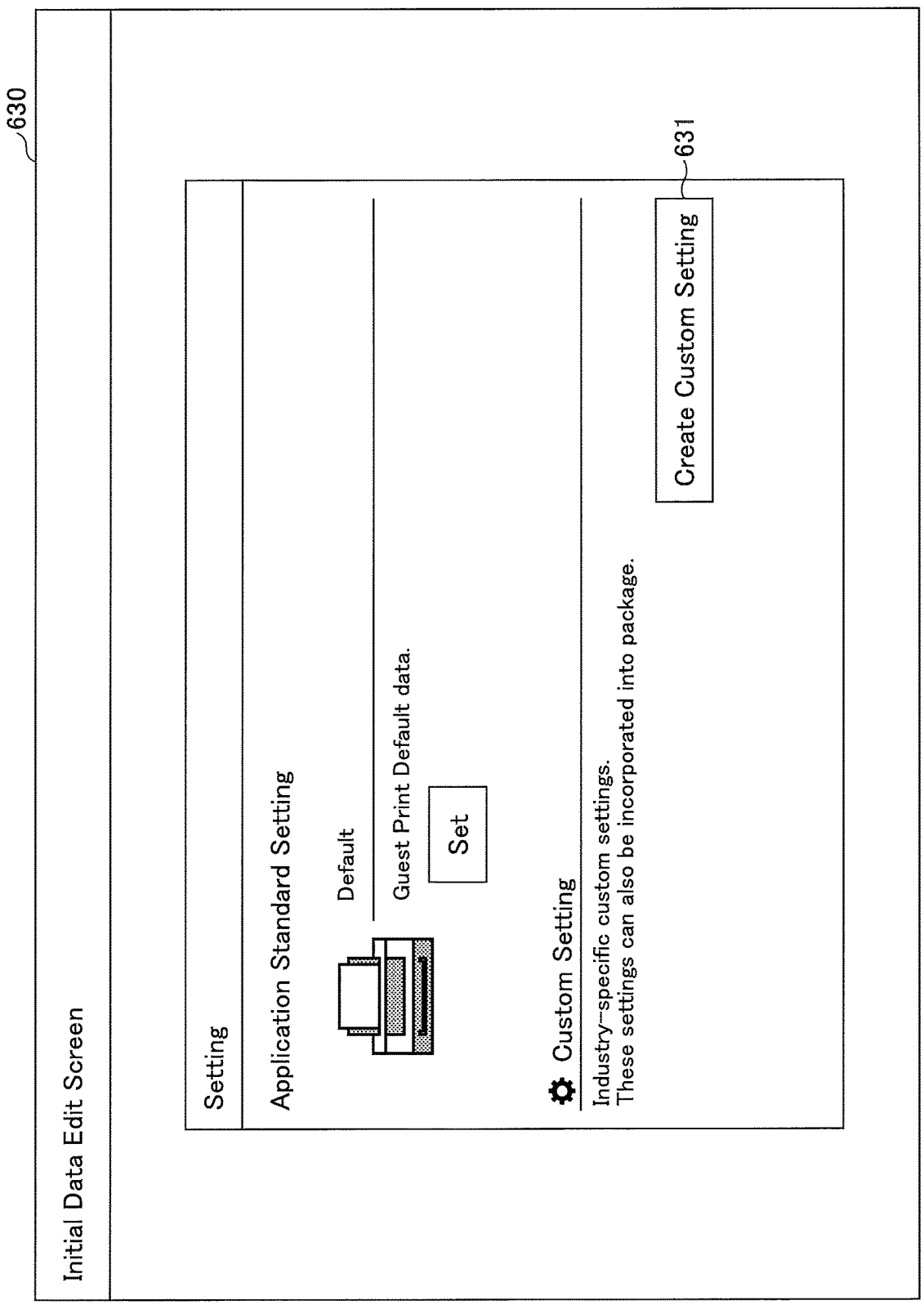
FIG. 29 is a diagram illustrating an example display of an initial data edit screen.

FIG. 29 is a diagram illustrating an example display of an initial data edit screen 630. In FIG. 29, the initial data edit screen 630 displays the current initial data. When the user presses a button 631 in the initial data edit screen 630, a screen for accepting setting changes to information items (icon, name, setting information, etc.) of the initial data is displayed. The user edits the initial data via this screen.

When an instruction to complete editing of the initial data is input by the user, the user terminal 30b transmits the edited initial data and the application ID of the application subjected to initial data editing to the application server 10b (step S411). The application development management unit 11 of the application server 10b associates the received initial data with the application stored in the application storage unit 122 that is associated with the received application ID (step S412). As a result, new initial data is associated with the application. That is, multiple sets of initial data may be associated with one application. The initial data among the multiple sets of initial data to be used may be selected for each package.

Note that even if a package is once created, if the configuration of the package does not meet the requirements of the market, product appeal of the package may be improved by changing the applications configuring the package and/or changing the initial data of the applications, for example. In this respect, according to an aspect of the present embodiment, the configuration of the package can be edited.

Figure 30:
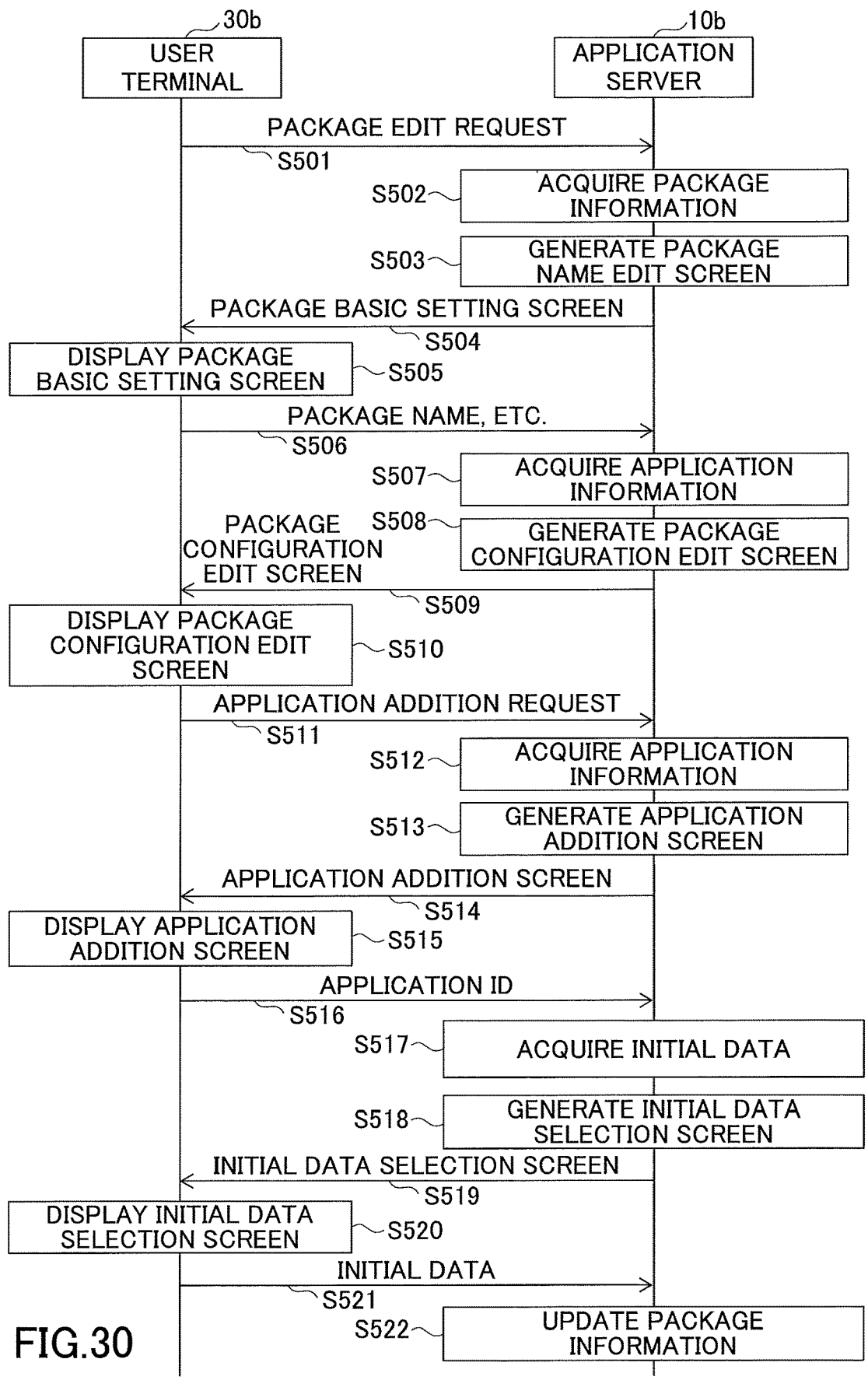
FIG. 30 is a sequence chart illustrating an example process sequence of a package editing process.

FIG. 30 is a sequence chart illustrating an example process sequence of a package editing process. It is assumed that in the process of FIG. 30, the package list screen 580 of FIG. 19 is initially displayed on the user terminal 30b.

Note that a link to a package edit request is provided on each package name displayed in the package list area 581 of the package list screen 580 of FIG. 19. When any one of the package names is selected by the user, the user terminal 30b sends a package edit request including the package ID of the package corresponding to the selected package name (hereinafter referred to as "target package") to the application server 10b (step S501). Upon receiving the package edit request, the package management unit 13 of the application server 10b acquires package information corresponding to the package ID included in the package edit request from the package information storage unit 123 (step S502). Then, the package management unit 13 generates a package basic setting screen based on the package information (step S504). Then, the package management unit 13 transmits the package basic setting screen to the user terminal 30b. In turn, the user terminal 30b displays the package basic setting screen (step S505).

Figure 31:
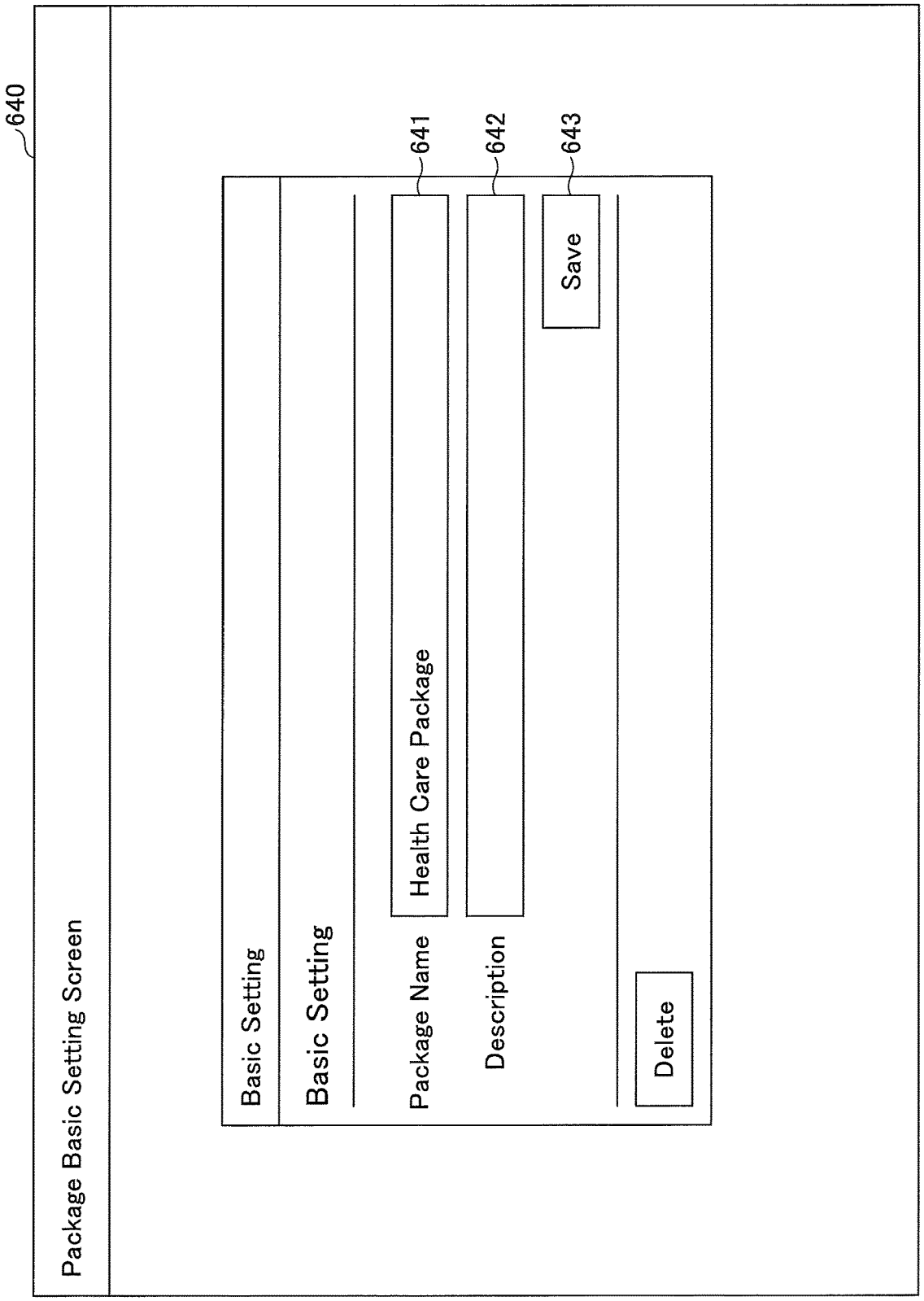
FIG. 31 is a diagram illustrating an example display of a package basic setting screen.

FIG. 31 is a diagram illustrating an example display of a package basic setting screen 640. In FIG. 31, the package basic setting screen 640 includes a package name input area 641 and a description input area 642. The package name input area 641 and the description input area 642 respectively display the current package name and the current description of the target package.

When the package name and/or description is edited and a button 643 is pressed by the user, the user terminal 30b transmits the edited package name and/or description to the application server 10b (step S506). Note that even when editing is not performed, when the button 643 is pressed, the package name and description displayed in the package name input area 641 and the description input area 642 are transmitted to the application server 10b.

The package management unit 13 of the application server 10b stores the received package name and description. Then, the package management unit 13 acquires from the application information storage unit 121, application information of each application ID in the application ID group included in the package information of the target package (step S507). Then, the package management unit 13 generates a package configuration edit screen based on the application information (step S508). Then, the package management unit 13 transmits the package configuration edit screen to the user terminal 30b (step S509). In turn, the user terminal 30b displays the package configuration edit screen (step S510).

Figure 32:
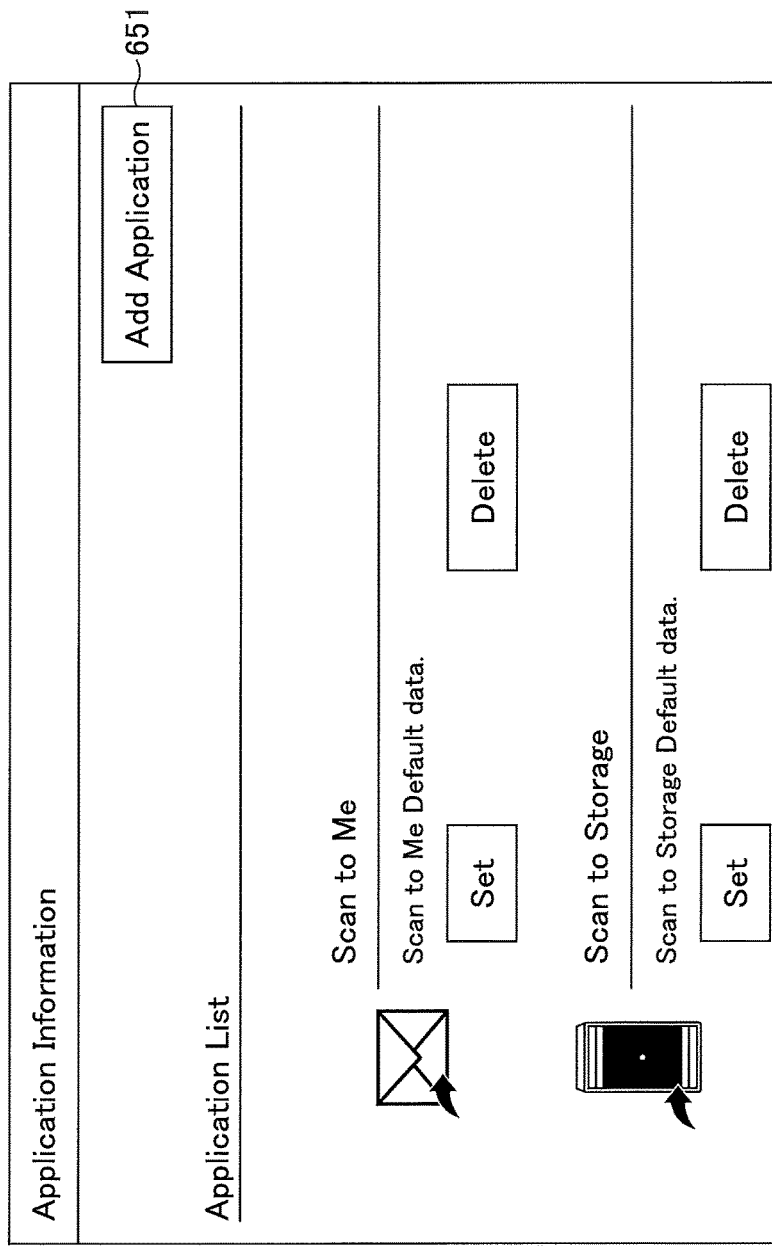
FIG. 32 is a diagram illustrating an example display of a package configuration edit screen.

FIG. 32 is a diagram illustrating an example display of a package configuration edit screen 650. In FIG. 32, the package configuration edit screen 650 displays a list of application information of each application included in the target package. The package configuration edit screen 650 enables deletion and change of setting information with respect to each application being displayed.

When a button 651 in the package configuration edit screen 650 is pressed, the user terminal 30b transmits an application addition request to the application server 10b (step S511). Upon receiving the application addition request, the package management unit 13 of the application server 10b acquires a list of application information from the application information storage unit 121 (step S512). Then, the package management unit 13 generates an application addition screen indicating the application information of each application included in the acquired list as an addition candidate to the package (step S513). Note that the application information of the application already included in the target package may be excluded from the addition candidate. Further, processes substantially identical to those of steps S314 to S316 of FIG. 15 may be executed so that the application information of each application released to the shared server 20 may also be included as an addition candidate. Then, the package management unit 13 transmits the application addition screen to the user terminal 30b (step S514). In turn, the user terminal 30b displays the application addition screen (step S515).

FIG. 33 is a diagram illustrating an example display of an application addition screen 660. In FIG. 33, the application addition screen 660 displays a list of the application information of each addition candidate application to the target package.

When application information of at least one application is selected from the application addition screen 660 and the button 661 is pressed, the user terminal 30b transmits the application ID corresponding to the selected application information to the application server 10b (step S516). Upon receiving the application ID, the package management unit 13 of the application server 10b stores the application ID.

Then, the package management unit 13 acquires from the application storage unit 122 the initial data of the application associated with the application ID (hereinafter referred to as "additional application") (step S517). Note that in the case where the additional application is associated with multiple sets of initial data, the package management unit 13 acquires the multiple sets of initial data associated with the additional application. Then, the package management unit 13 generates an initial data selection screen for enabling selection of initial data that is valid for the additional application to be added to the target package (step S518). Then, the package management unit 13 transmits the initial data selection screen to the user terminal 30b (step S519). In turn, the user terminal 30b displays the initial data selection screen (step S520).

FIG. 34 is a diagram illustrating an example display of an initial data selection screen 670. In FIG. 34, the initial data selection screen 670 displays a list of initial data associated with the additional application. Note that initial data may be created for different languages, such English and Japanese, for example.

When any one of the initial data is selected from the initial data list and the button 671 is pressed, the user terminal 30b transmits the selected initial data to the application server 10b (step S521). Upon receiving the selected initial data, the package management unit 13 of the application server 10b updates the package information stored in association with the target package in the package information storage unit 123 (step S522). Specifically, the package name and description of the target package are updated to the package name and description received in step S506. Also, the application ID received in step S516 is added to the application ID group of the package information of the target package. Also, the initial data received in step S521 is associated with the package information. Note that when deletion of any one of the applications listed in the application list of the package configuration edit screen 650 is instructed, the application ID of the designated application is deleted from the application ID group of the package information of the target package.

Figure 35:
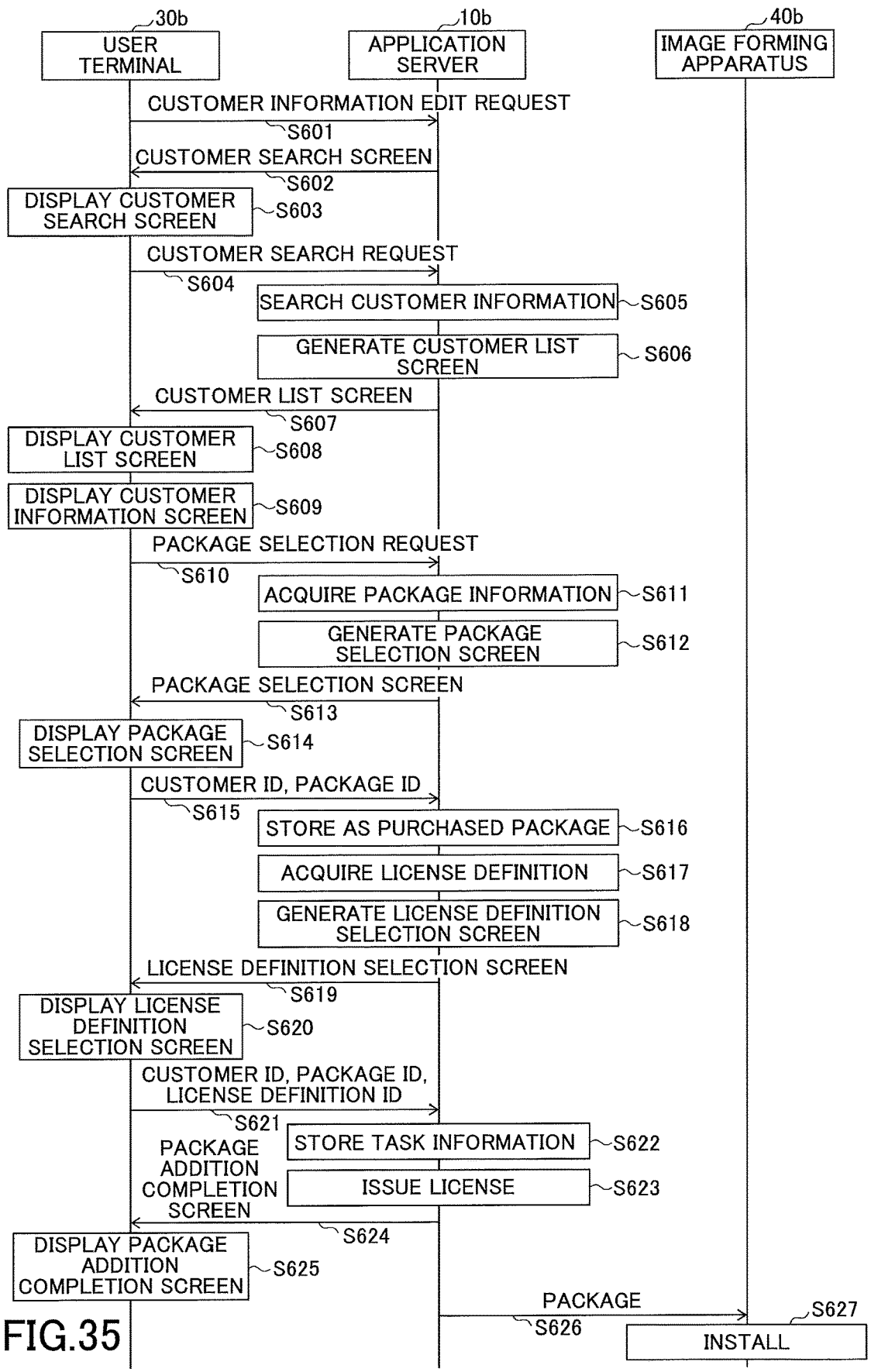
FIG. 35 is a sequence chart illustrating an example process sequence of a package installation process.

In the following, a process for installing the package in the image forming apparatus 40 of the customer is described. FIG. 35 is a sequence chart illustrating an example process sequence of a package installation process. In the process of FIG. 35, the customer management menu screen 570 of FIG. 17 is initially displayed on the user terminal 30b.

When the link 572 of the customer management menu screen 570 of FIG. 17 is selected, the user terminal 30b transmits a customer information edit request to the application server 10b (step S601). In response to receiving the customer information edit request, the customer information management unit 14 of the application server 10b transmits a customer search screen to the user terminal 30b (step S602). In turn, the user terminal 30b displays the customer search screen (step S603).

FIG. 36 is a diagram illustrating an example display of a customer search screen 680. In FIG. 36, the customer search screen 680 includes a search condition input area that accepts a search condition for searching customer information. For example, customer information may be searched based on customer name, customer ID, and the like.

When a search condition is entered and the button 681 is pressed, the user terminal 30b transmits a search request including the search condition to the application server 10b (step S604). The customer information management unit 14 of the application server 10b searches the customer information storage unit 124 for customer information matching the search condition (step S605).

FIG. 37 is a table illustrating an example configuration of the customer information storage unit 124. In FIG. 37, the customer information storage unit 124 stores information items including "customer ID", "password", "customer name", "use", "registration category", "registrant", "country", "purchased package", and "issued license ID" for each customer of the base of the application server 10.

The "customer ID" is identification information for identifying each customer. The "password" is a password associated with the customer ID. The "customer name" is the name of the customer. The "use" indicates the usage status of the application or image forming apparatus 40 used by the customer. The "registration category" indicates a category under which the customer information is registered. The "registrant" indicates the person that has registered the customer information. The "country" is the name of the country where the customer is located. The "purchased package" is a list of package IDs of packages purchased by the customer. The "issued license ID" is identification information of license data issued with respect to the purchased package.

Then, the customer information management unit 14 generates a customer list screen including a list of customer information that has been found to match the search condition (step S606). Then, the customer information management unit 14 transmits the customer list screen to the user terminal 30b (step S607). In turn, the user terminal 30b displays the customer list screen (step S608).

FIG. 38 is a diagram illustrating an example display of a customer list screen 690. In FIG. 38, the customer list screen 690 includes a list of customer information that matches the search condition.

When the user selects any one of the customer information listed in the customer list screen 690, the user terminal 30b displays a customer information screen based on a definition of the customer list screen 690 (step S609). In the following descriptions, the customer associated with the selected customer information is referred to as "target customer".

FIG. 39 is a diagram illustrating an example display of a customer information screen 710. In FIG. 39, the customer information screen 710 includes a customer information area 711 and a purchased package information area 712. The customer information area 711 displays customer information of the target customer other than the purchased package. The purchased package information area 712 displays package information associated with each package ID included in the purchased package of the customer information of the target customer. In the example of FIG. 39, the target customer has no purchase record of purchasing a package, and as such, no package information is displayed in the purchased package information area 712.

Then, when the user presses an "add package" button 713, the user terminal 30b transmits a package selection request to the application server 10b (step S610). In response to receiving the package selection request, the customer information management unit 14 of the application server 10b acquires a list of package information from the package information storage unit 123 (step S611). Then, the customer information management unit 14 generates a package selection screen including the package information list (step S612). Then, the customer information management unit 14 transmits the package selection screen to the user terminal 30b (step S613). In turn, the user terminal 30b displays the package selection screen (step S614).

FIG. 40 is a diagram showing a display example of the package selection screen. In FIG. 40, the package selection screen 720 displays a list of packages. Note that FIG. 40 illustrates an example case indicating that one package is sold at base B.

When the user selects the package purchased by the customer and presses an "assign package" button 721, the user terminal 30b transmits the customer ID of the target customer and the package ID of the selected package to the application server 10b (step S615).

The customer information management unit 14 of the application server 10b stores the received package ID under the item "purchased package" of the customer information associated with the customer ID in the customer information storage unit 124 (FIG. 37) (step S616). Then, the customer information management unit 14 acquires from the license definition storage unit 128, a license definition with the validity status indicated as "valid" among the license definitions associated with the package ID (step S617). Note that when multiple package IDs are received, a license definition is acquired for each package ID. However, no license definition is acquired for a package that is not subject to license control (i.e., a package with package information having "invalid" set for license control).

Then, the customer information management unit 14 generates a license definition selection screen based on the acquired license definition (step S618). Then, the customer information management unit 14 transmits the license definition selection screen to the user terminal 30*b* (step S619). In turn, the user terminal 30*b* displays the license definition selection screen (step S620).

FIG. 41 is a diagram illustrating an example display of a license definition selection screen 790. In FIG. 41, the license definition selection screen 790 displays, for each package selected from the package selection screen 720, the license definition name and the validity period of each license definition associated with the package. Also, radio buttons are arranged next to the license definitions for each package such that one license definition can be selected for each package.

Note that although only one package is displayed in the example package selection screen 720 of FIG. 40, three packages are displayed as selection packages in the example license definition selection screen 790 of FIG. 41 for the sake of convenience of explanation. Also, note that for the third package ("Selection Package C") of the packages displayed in the license definition selection screen 790 of FIG. 41, the license control is set to "invalid", and as such, a license definition is not displayed as a selection candidate for this package.

When the user selects one of the license definitions for each package, the user terminal 30*b* transmits the customer ID of the target customer, the package ID of each package, and the license definition ID of the license definition selected for each package to the application server 10*b* (step S621).

The customer information management unit 14 of the application server 10*b* stores the customer ID and the package ID of each package in association with each other in the task information storage unit 126 (step S622). Then, the customer information management unit 14 executes a license issuing process with respect to each package (step S623).

In the license issuing process, first, license data is generated based on the license definition with the license definition ID received for each package ID. The generated license data is then stored in the license storage unit 129.

FIG. 42 is a table illustrating an example configuration of the license storage unit 129. In FIG. 42, the license storage unit 129 stores license data that have been issued. Each license data includes a "license ID", a "license definition ID", a "use start date", a "use end date", and a "status". The "license ID" is identification information for identifying each license. The "license definition ID" is the license definition ID of the license definition corresponding to the license data. The "use start date" is the year, month, and day on which use of license data is started. For example, the date on which step S622 is executed may be set as the use start date. The "use end date" is the date on which use of the license data is terminated. The "use end date" is determined based on the validity period of the license definition corresponding to the license data starting from the use start date. The "status" is information indicating the validity of the license data. That is, the license data is valid during the period from the use start date to the use end date and is invalid in other periods.

The customer information management unit 14 also adds the license ID of each set of license data stored in the license storage unit 129 to the issued license ID of the customer information associated with the target customer in the customer information storage unit 124 of FIG. 37. Thereafter, the license issuing process is ended.

Then, the customer information management unit 14 transmits a package addition completion screen to the user terminal 30*b* (step S624). In turn, the user terminal 30*b* displays the package addition completion screen (step S625).

Figure 43:
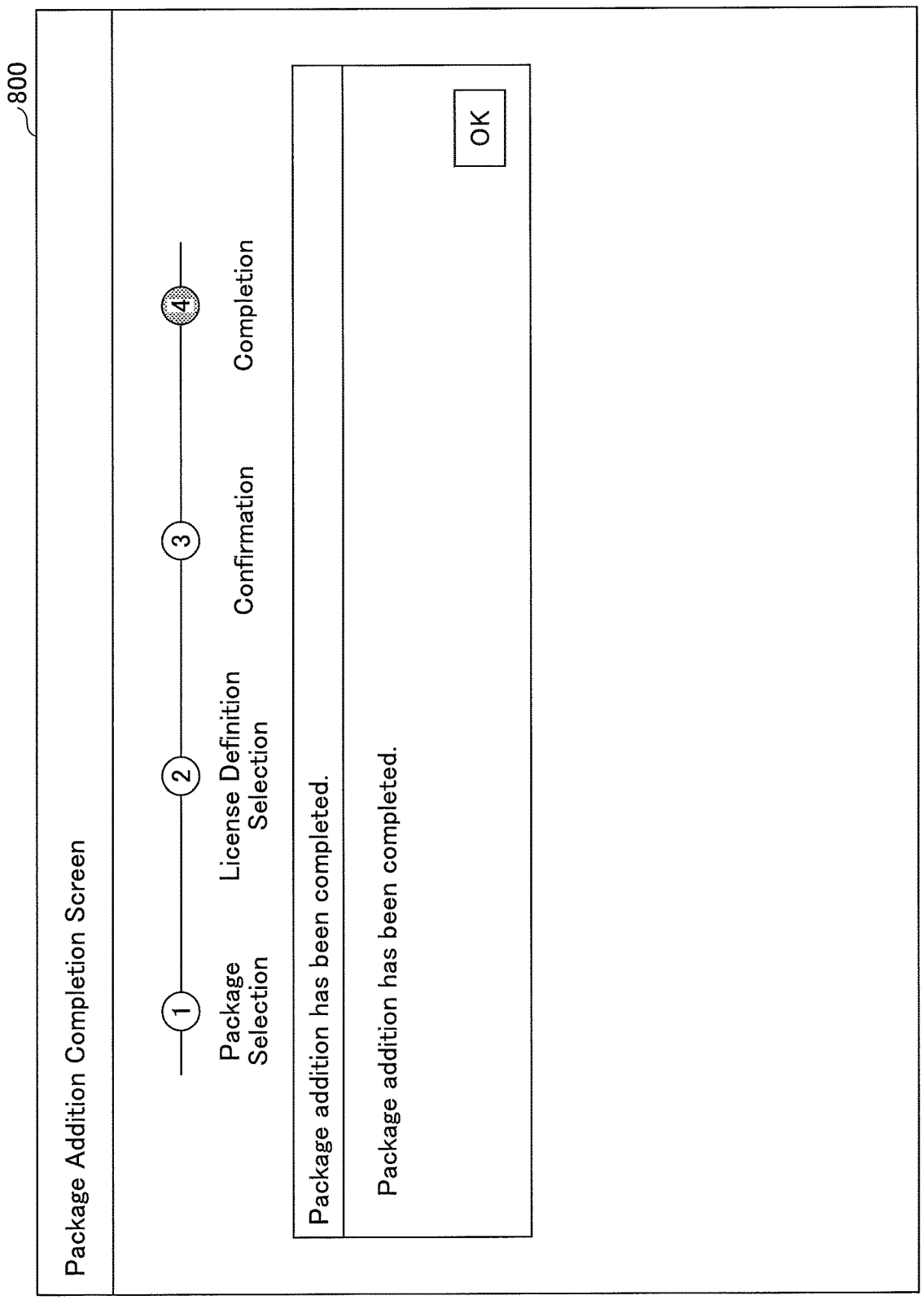
FIG. 43 is a diagram illustrating an example display of a package addition completion screen.

FIG. 43 is a diagram illustrating an example display of a package addition completion screen 800. In FIG. 43, the package addition completion screen 800 includes a message indicating that addition of a package (acceptance of an installation instruction to the image forming apparatus 40) has been completed.

Then, at a given time thereafter, the device management unit 15 transmits to each image forming apparatus 40*b* associated with the customer ID stored in the task information storage unit 126, the applications configuring the package identified by the package ID stored in association with the customer ID in the task information storage unit 126 (step S626).

Note that each image forming apparatus 40*b* associated with the customer ID can be identified by referring to the device information storage unit 125. That is, the device information storage unit 125 stores identification information of each image forming apparatus 40*b* used by a customer in association with the customer ID of the customer. Also, note that the timing at which the device management unit 15 transmits the applications to the image forming apparatus 40*b* may be at any given time, such as when the application server 10*b* receives a request or an inquiry from the corresponding image forming apparatus 40*b*, for example. Also, note that each of the applications configuring a package can be identified based on the application ID group stored in association with the package ID of the package in the package information storage unit 123.

Upon receiving the applications from the application server 10*b*, the image forming apparatus 40*b* installs the received applications (step S627).

In the following, a process executed by a given customer when using an application in the image forming apparatus 40 is described.

Figure 44:
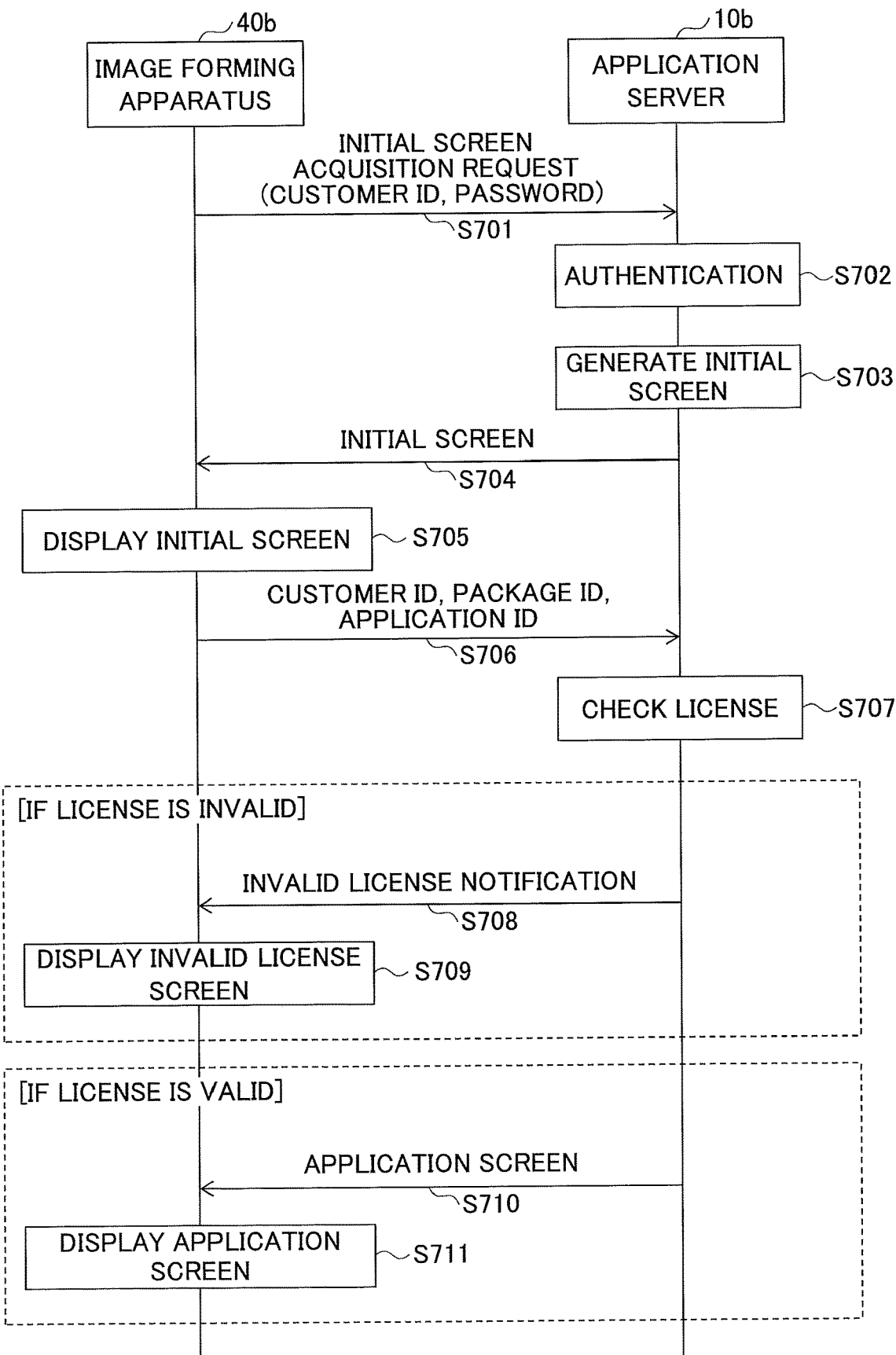
FIG. 44 is a sequence chart illustrating an example process sequence executed upon using an application.

FIG. 44 is a sequence chart illustrating an example sequence of the process executed when using an application in the image forming apparatus 40. In FIG. 44, an example case where a customer of base B operates the image forming apparatus 40*b* is described.

For example, when the customer (operator) inputs a customer ID and a password to the image forming apparatus 40*b* to use the application, the image forming apparatus 40*b* transmits an initial screen acquisition request including the customer ID and the password to the application server 10*b* (step S701).

The component execution unit 16 of the application server 10*b* performs authentication based on the customer ID and password (step S702). Specifically, if a customer information record including the customer ID and the password is stored in the customer information storage unit 124, the authentication is deemed to be successful, and if not, the authentication ends in failure. When the authentication fails, the component execution unit 16 transmits a response indicating authentication failure to the image forming apparatus 40b. In this case, the image forming apparatus 40b displays a login screen and waits for a customer ID and a password to be input. On the other hand, if the authentication is successful, the component execution unit 16 generates an initial screen (step S703). The initial screen displays icons of the applications included in the purchased package stored in association with the authenticated customer ID in the customer information storage unit 124. Note that the applications included in the purchased package can be identified based on the application ID group associated with the package ID of the purchased package in the package information storage unit 123 (FIG. 18). The icons of the applications can be identified by referring to the application information storage unit 121 (FIG. 8).

Then, the component execution unit 16 transmits the generated initial screen to the image forming apparatus 40b (step S704). In turn, the image forming apparatus 40b displays the initial screen on an operation panel (step S705).

Figure 45:
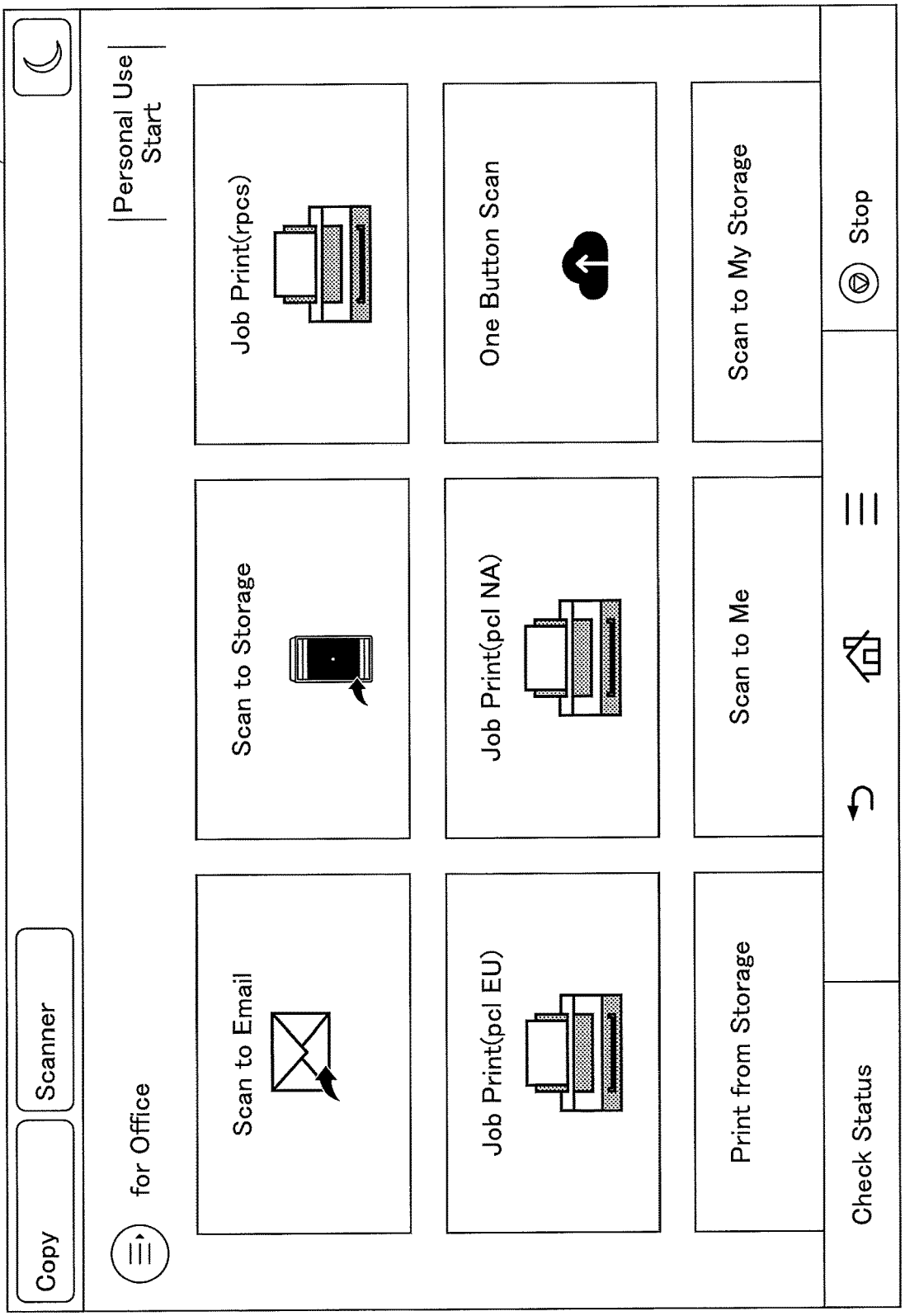
FIG. 45 is a diagram illustrating an example display of an initial screen.

FIG. 45 is a diagram illustrating an example display of an initial screen 810. In FIG. 45, the initial screen 810 displays an icon for each application.

When an icon of an applications is selected from the application icons displayed on the initial screen 810, the image forming apparatus 40b transmits the customer ID, the package ID of the package to which the selected application belongs, and the application ID of the selected application to the application server 10b (step S706).

The component execution unit 16 of the application server 10b executes a license check with respect to the selected application (step S707). Specifically, the component execution unit 16 acquires the issued license ID stored in association with the customer ID in the customer information storage unit 124 (FIG. 37). Then, the component execution unit 16 checks whether the following statements (1) and (2) are satisfied with respect to the acquired license ID.

(1) The value "valid" is set as the "status" stored in association with the license ID in the license storage unit 129 of FIG. 42.

(2) With respect to the license definition identified by the license definition ID stored in association with the acquired license ID in the license storage unit 129 of FIG. 42, the package ID stored in association with the license definition in the license definition storage unit 128 of FIG. 22 matches the received package ID.

If both (1) and (2) are satisfied, the component execution unit 16 determines that the license is valid. If at least one of (1) and (2) is not satisfied, the component execution unit 16 determines that the license is invalid.

When the license is invalid, the component execution unit 16 transmits a notification indicating that the license is invalid to the image forming apparatus 40b (step S708). In this case, the image forming apparatus 40b displays an invalid license screen superimposed on the initial screen 810 (step S709).

FIG. 46 is a diagram illustrating an example display of an invalid license screen 820. In FIG. 46, a message indicating that the application cannot be used because the license is invalid is displayed on the license invalidation screen 820.

On the other hand, if the license is valid, the component execution unit 16 transmits an application screen of the application identified by the application ID received in step S706 (hereinafter referred to as "application screen") to the image forming apparatus 40b (step S710). In turn, the image forming apparatus 40b displays the application screen on the operation panel (step S711).

FIG. 47 is a diagram illustrating an example display of an application screen 830. The application screen 830 of FIG. 47 is an example screen of an application for delivering image data of a document scanned by the image forming apparatus 40b to a predetermined folder. The application screen 830 includes an area for accepting a scan setting and an area for accepting a selection of a delivery destination folder, for example.

By performing license management with respect to each application in the above-described manner, unrestricted use of an application may be prevented, for example. Also, usage of a package and an application by each customer may be easily determined such that fees to be collected may be easily determined, for example.

As described above, according to an aspect of the present embodiment, an application individually developed at a given base may be imported to another base. Also, a package including the imported application may be created at the other base. In this way, portability and reusability of a program developed for a device at each base may be improved, for example.

Note that in the above-described embodiment, the image forming apparatus 40 is described as an example of a device for which applications are developed. However, aspects of the present embodiment may be applied to other devices, such as a projector, a digital whiteboard, and a video conference system, for example.

Also, note that the application server 10b of the above-described embodiment is an example embodiment of a first information processing apparatus. The application server 10a is an example embodiment of a second information processing apparatus. The shared server 20 is an example embodiment of a third information processing apparatus. The application storage unit 122 is an example embodiment of a first storage unit. The base asset management unit 12 and the package management unit 13 are an example embodiment of a processor that receives a second program via a network and generates a program product unit. The asset information storage unit 212 is an example embodiment of a second storage unit. The device management unit 15 is an example embodiment of the processor that transmits the program product unit to a terminal. The license definition storage unit 128 is an example embodiment of a third storage unit. A customer is an example of a purchaser. The license storage unit 129 is an example embodiment of a fourth storage unit. The customer information management unit 14 is an example embodiment of the processor that generates and stores license data for a purchaser.

Although the present invention has been described above with reference to certain illustrative embodiments, the present invention is not limited to these embodiments, and numerous variations and modifications may be made without departing from the scope of the present invention.

What is claimed is:

1. An information processing system comprising:
a first information processing apparatus; and
a second information processing apparatus;
wherein the first information processing apparatus includes
a first storage unit configured to store
one or more first programs that have been developed at a first region and that are installed in at least one first-region image forming apparatus sold within the first region; and a first processor configured to implement processes of
authenticating login information of a user, and associating the user with the first region based on the login information;
displaying an application selection screen for accepting a selection of applications to be included in a program product unit, the applications being selected from among
the one or more first programs developed at the first region, and
one or more second programs developed at a second region different from the first region authorized for release in the first region, the one or more second programs being programs that are installed in at least one second-region image forming apparatus sold within the second region, and being stored in the second information processing apparatus;
receiving, via a network, a selected second program from among the one or more second programs;
storing the received selected second program in the first storage unit;
generating the program product unit based on the selected applications that have been selected by the logged-in user, the program product unit including the selected one or more first programs and the received selected second program that are stored in the first storage unit; and
transmitting the generated program product unit to the first-region image forming apparatus.

2. The information processing system according to claim 1, further comprising:
a third information processing apparatus that is connected to the first information processing apparatus and the second information processing apparatus via the network;
wherein the third information processing apparatus includes a second storage unit configured to store second program identification information identifying the selected second program authorized for release to a region other than the second region; and
wherein the first processor of the first information processing apparatus receives the selected second program via the network in response to determining that the second program identification information stored in the second storage unit is included in selected program identification information that is selected by the logged-in user from a program identification information list including the second program identification information stored in the second storage unit and first program identification information identifying the one or more first programs stored in the first storage unit.

3. The information processing system according to claim 2, wherein
the first processor of the first information processing apparatus receives the selected second program identified by the second program identification information stored in the second storage unit via the network and stores the received selected second program identification information in the first storage unit.

4. The information processing system according to claim 2, wherein
the second storage unit of the third information processing apparatus stores release information indicating a region to which the second program is authorized for release in association with the second program identification information;
the program identification information list includes the second program identification information stored in the second storage unit that identifies the second program that is authorized for release in the first region; and
the first processor of the first information processing apparatus receives the selected second program via the network in response to determining that the second program identification information stored in the second storage unit is included in the selected program identification information that is selected by the logged-in user from the program identification information list including the second program identification information identifying the second program that is authorized for release in the first region.

5. The information processing system according to claim 2, wherein the third information processing apparatus includes a second processor configured to implement processes of
receiving, from the second information processing apparatus, a program release request including region identification information identifying the second region and the second program identification information identifying the second program that has been developed at the second region and stored in the second information processing apparatus;
storing the received second program identification information in association with the received region identification information in the second storage unit;
generating the program identification information list including the second program identification information stored in the second storage unit in response to a request originating from a terminal present in the first region, and transmitting the generated program identification information list to the terminal;
receiving the selected program identification information including the second program identification information that has been selected by the logged-in user from the program identification information list at the terminal;
acquiring the second program identified by the second program identification information included in the selected program identification information from the second information processing apparatus present in the second region that is identified by the region identification information stored in association with the second program identification information in the second storage unit; and
transmitting the acquired second program to the first information processing apparatus present in the first region.

6. The information processing system according to claim 1, wherein
the first-region image forming apparatus is communicably connected to the first information processing apparatus via the network.

7. The information processing system according to claim 1, wherein
the first information processing apparatus further includes a third storage unit configured to store license definition information in association with the program product unit; and
the first processor of the first processing apparatus further implements processes of generating the license definition information for the program product unit, and storing the generated license definition information in association with the program product unit in the third storage unit.

8. The information processing system according to claim 7, wherein
the first information processing apparatus further includes a fourth storage unit configured to store license data in association with purchaser identification information of a purchaser of the program product unit; and
the first processor of the first information processing apparatus further implements processes of generating the license data for the purchaser of the program product unit based on the license definition information that has been generated for the program product unit, and storing the generated license data in association with the purchaser identification information of the purchaser in the fourth storage unit.

9. The information processing system according to claim 1, wherein the first processor further implements processes of
associating program product identification information that identifies the generated program product unit with customer identification information that at least specifies an image forming apparatus from among the at least one first-region image forming apparatus, wherein
the specified image forming apparatus installs the generated program product unit after receiving the generated program product unit from the first information processing apparatus.

10. The information processing system according to claim 9, wherein
the first information processing apparatus transmits the generated program product unit to the specified image forming apparatus in response to a request transmitted by the specified image forming apparatus.

11. An information processing apparatus comprising:
a storage unit configured to store one or more first programs that have been developed at a first region and that are installed in at least one first-region image forming apparatus sold within the first region; and
a processor configured to implement processes of
authenticating login information of a user, and associating the user with the first region based on the login information;
displaying an application selection screen for accepting a selection of applications to be included in a program product unit, the applications being selected from among
the one or more first programs developed at the first region, and
one or more second programs developed at a second region different from the first region authorized for release in the first region, the one or more second programs being programs that are installed in at least one second-region image forming apparatus sold within the second region, and being stored in the second information processing apparatus;
receiving, via a network, a selected second program from among the one or more second programs;
storing the received selected second program in the first storage unit;
generating the program product unit based on the selected applications that have been selected by the logged-in user, the program product unit including one or more first programs and the received selected second program that are stored in the first storage unit; and
transmitting the generated program product unit to the first-region image forming apparatus.

12. The information processing apparatus according to claim 11, wherein the processor further implements processes of
associating program product identification information that identifies the generated program product unit with customer identification information that at least specifies an image forming apparatus from among the at least one first-region image forming apparatus, wherein
the specified image forming apparatus installs the generated program product unit after receiving the generated program product unit from the first information processing apparatus.

13. The information processing apparatus according to claim 12, wherein
the information processing apparatus transmits the generated program product unit to the specified image forming apparatus in response to a request transmitted by the specified image forming apparatus.

14. An information processing method that is implemented by an information processing apparatus including a storage unit configured to store one or more first programs that have been developed at a first region and that are installed in at least one first-region image forming apparatus sold within the first region, the information processing method comprising:
authenticating login information of a user, and associating the user with the first region based on the login information;
displaying an application selection screen for accepting a selection of applications to be included in a program product unit, the applications being selected from among
the one or more first programs developed at the first region, and
one or more second programs developed at a second region different from the first region authorized for release in the first region, the one or more second programs being programs that are installed in at least one second-region image forming apparatus sold within the second region, and being stored in the second information processing apparatus;
receiving, via a network, a selected second program from among the one or more second programs;
storing the received selected second program in the first storage unit;
generating the program product unit based on the selected applications that have been selected by the logged-in user, the program product unit including the selected one or more first programs and the received selected second program that are stored in the first storage unit; and
transmitting the generated program product unit to the first-region image forming apparatus.

15. The information processing method according to claim 14, further comprising:
associating program product identification information that identifies the generated program product unit with customer identification information that at least specifies an image forming apparatus from among the at least one first-region image forming apparatus, wherein
the specified image forming apparatus installs the generated program product unit after receiving the generated program product unit from the first information processing apparatus.

16. The information processing method according to claim 15, wherein the information processing apparatus transmits the generated program product unit to the specified image forming apparatus in response to a request transmitted by the specified image forming apparatus.

* * * * *